US011393196B2

(12) United States Patent
Itoh et al.

(10) Patent No.: US 11,393,196 B2
(45) Date of Patent: Jul. 19, 2022

(54) LINE OF SIGHT ASSISTANCE DEVICE AND METHOD

(71) Applicant: TOYOTA JIDOSHA KABUSHIKI KAISHA, Toyota (JP)

(72) Inventors: Kazuhiro Itoh, Mishima (JP); Hitoshi Kumon, Aichi-ken (JP); Shuntaro Shinohara, Susono (JP); Yoshitaka Fuwamoto, Mishima (JP); Shioya Kageyama, Ebina (JP); Shintaro Inoue, Kanagawa-ken (JP); Kiyofumi Nakajima, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/700,031

(22) Filed: Dec. 2, 2019

(65) Prior Publication Data
US 2020/0184220 A1    Jun. 11, 2020

(30) Foreign Application Priority Data
Dec. 10, 2018 (JP) .............................. JP2018-231164

(51) Int. Cl.
G06V 20/20    (2022.01)
G06T 11/00    (2006.01)
G06T 7/20     (2017.01)

(52) U.S. Cl.
CPC ............... *G06V 20/20* (2022.01); *G06T 7/20* (2013.01); *G06T 11/00* (2013.01)

(58) Field of Classification Search
None
See application file for complete search history.

(56) References Cited

U.S. PATENT DOCUMENTS

| 2006/0016398 | A1  | 1/2006  | Dubost et al.         |
|--------------|-----|---------|-----------------------|
| 2009/0140881 | A1* | 6/2009  | Sakai ........ B60R 1/00 340/901 |
| 2009/0268025 | A1  | 10/2009 | Hiramaki et al.       |
| 2010/0315215 | A1  | 12/2010 | Yuda                  |
| 2014/0019005 | A1* | 1/2014  | Lee ........ G08G 1/0962 701/36 |
| 2016/0114727 | A1  | 4/2016  | Watanabe              |

(Continued)

FOREIGN PATENT DOCUMENTS

| CN | 101313576 A  | 11/2008 |
|----|--------------|---------|
| CN | 105539287 A  | 5/2016  |

(Continued)

OTHER PUBLICATIONS

File:Vertical FOV.svg. (Nov. 2, 2014). Retrieved Jan. 15, 2021, from https://en.wikipedia.org/wiki/File:Vertical_FOV.svg (Year: 2014).*

*Primary Examiner* — Vu Nguyen
(74) *Attorney, Agent, or Firm* — Sughrue Mion, PLLC

(57) ABSTRACT

An assistance device enabling communication with a wearable device includes: a memory; and a processor including hardware, the processor being configured to acquire line-of-sight information about a line of sight of a user wearing the wearable device, based on the line-of-sight information, generate blind region state information indicating a state of a blind region shielded by a shielding object in a visual field region of the user, and output the blind region state information to the wearable device.

15 Claims, 20 Drawing Sheets

(56) References Cited

U.S. PATENT DOCUMENTS

| | | | |
|---|---|---|---|
| 2018/0101736 A1* | 4/2018 | Han | G06T 11/60 |
| 2018/0129888 A1* | 5/2018 | Schubert | G06K 9/00791 |
| 2018/0259338 A1* | 9/2018 | Stokes | G01C 21/203 |
| 2018/0259339 A1 | 9/2018 | Johnson et al. | |
| 2018/0359429 A1 | 12/2018 | Shinkai | |
| 2019/0156134 A1* | 5/2019 | Krishnan | A61B 5/225 |
| 2019/0360810 A1 | 11/2019 | Johnson et al. | |
| 2020/0238921 A1* | 7/2020 | Matsuba | B60R 11/04 |

FOREIGN PATENT DOCUMENTS

| | | |
|---|---|---|
| JP | 2002-286459 A | 10/2002 |
| JP | 2008-500709 A | 1/2008 |
| JP | 4329525 B2 | 9/2009 |
| JP | 2010-175329 A | 8/2010 |
| JP | 2011-213184 A | 10/2011 |
| JP | 4935571 B2 | 5/2012 |
| JP | 2013-162328 A | 8/2013 |
| JP | 2014-035560 A | 2/2014 |
| JP | 5516998 B2 | 6/2014 |
| WO | 2009/119110 A1 | 10/2009 |
| WO | 2017/145645 A1 | 8/2017 |
| WO | 2017136014 A3 | 12/2017 |

* cited by examiner

LINE OF SIGHT ASSISTANCE DEVICE AND METHOD

CROSS-REFERENCE TO RELATED APPLICATION(S)

The present application claims priority to and incorporates by reference the entire contents of Japanese Patent Application No. 2018-231164 filed in Japan on Dec. 10, 2018.

BACKGROUND

1. Technical Field

The present disclosure relates to an assistance device, an assistance method, and a computer-readable recording medium.

2. Related Art

A technique for displaying on a mobile phone an image around a vehicle seen from a viewpoint of a user in the vehicle is known (for example, refer to JP 2013-162328 A). In this technique, when the user in the vehicle aims the mobile phone, an image in which the vehicle is transparent in a direction in which the user aims the mobile phone is displayed on a display of the mobile phone.

SUMMARY

Meanwhile, along with development of high-speed and high-capacity communication, a device that can acquire a large amount of information via a network has been manufactured. Under such circumstances, it is expected that the device can make the user wearing the device intuitively grasp a danger hidden in a surrounding environment of the user based on information that the device has acquired by means of communication.

The disclosure is accomplished by taking such matters as mentioned above into consideration thereof, and it is desirable to provide an assistance device, an assistance method, and a computer-readable recording medium enabling a user to intuitively grasp a surrounding environment.

In some embodiments, provided is an assistance device enabling communication with a wearable device. The assistance device includes: a memory; and a processor including hardware, the processor being configured to acquire line-of-sight information about a line of sight of a user wearing the wearable device, based on the line-of-sight information, generate blind region state information indicating a state of a blind region shielded by a shielding object in a visual field region of the user, and output the blind region state information to the wearable device.

In some embodiments, provided is an assistance device configured to be worn by a user. The assistance device includes: a memory; and a processor including hardware. The processor is configured to acquire line-of-sight information about a line of sight of the user, based on the line-of-sight information, generate blind region state information indicating a state of a blind region shielded by a shielding object in a visual field region of the user, and output the blind region state information.

In some embodiments, provided is an assistance method performed by an assistance device enabling communication with a wearable device. The assistance method includes: acquiring line-of-sight information about a line of sight of a user wearing the wearable device, based on the line-of-sight information read out from a memory, generating blind region state information indicating a state of a blind region shielded by a shielding object in a visual field region of the user, and outputting the blind region state information to the wearable device.

In some embodiments, provided is a non-transitory computer-readable recording medium with an executable program stored thereon. The program causes an assistance device enabling communication with a wearable device to execute: acquiring line-of-sight information about a line of sight of a user wearing the wearable device; based on the line-of-sight information, generating blind region state information indicating a state of a blind region shielded by a shielding object in a visual field region of the user; and outputting the blind region state information to the wearable device.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Hereinbelow, embodiments of the disclosure will be described with reference to the drawings. Note that the disclosure is not limited to the following embodiments. Also, in the following description, identical components are labeled with the same reference signs.

First Embodiment

Configuration of Assistance System

Figure 1:
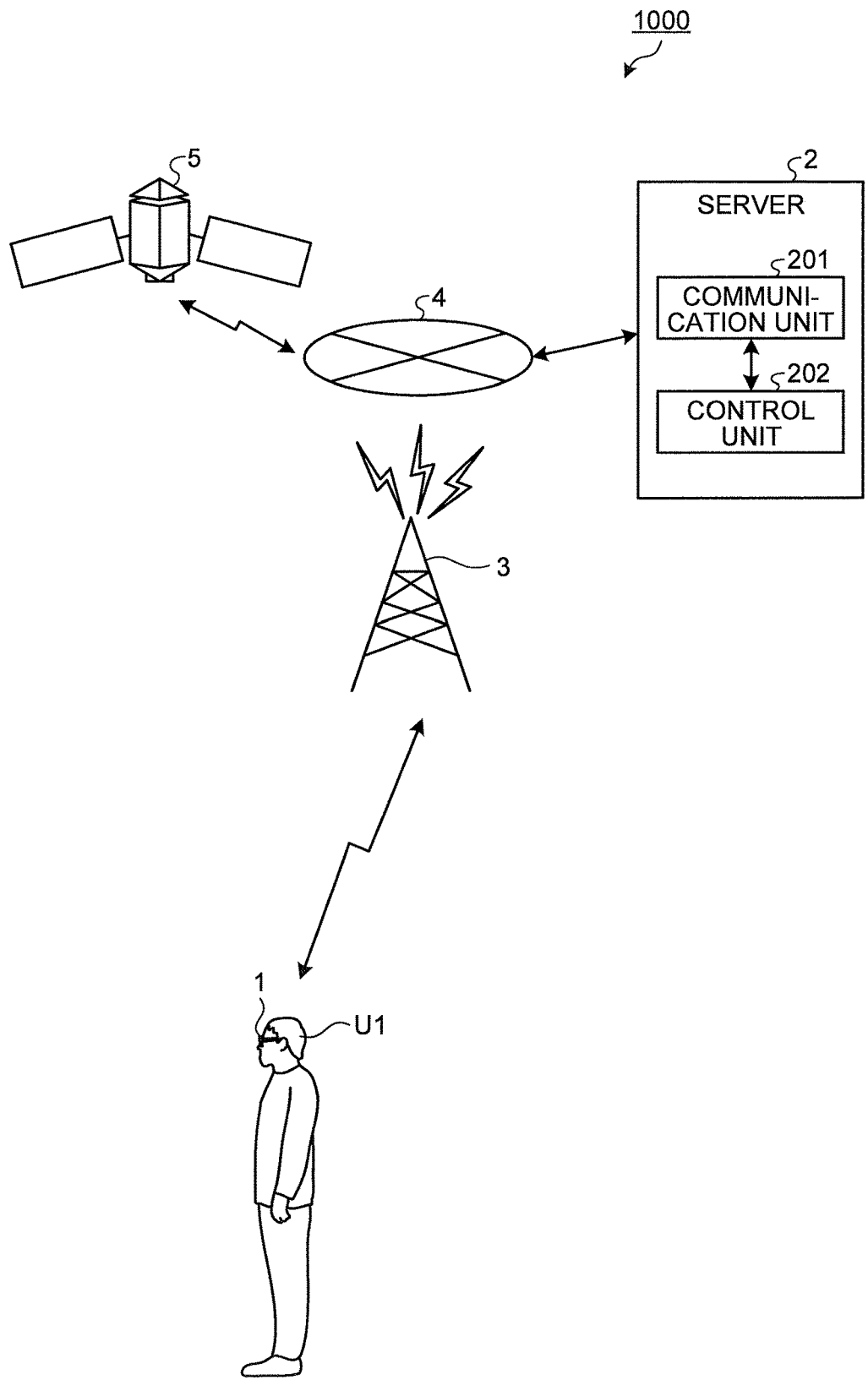
FIG. 1 is a schematic view illustrating a schematic configuration of an assistance system according to a first embodiment.
Figure 2:
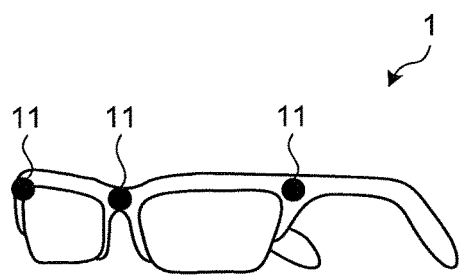
FIG. 2 illustrates a schematic configuration of a wearable device according to the first embodiment.
Figure 3:
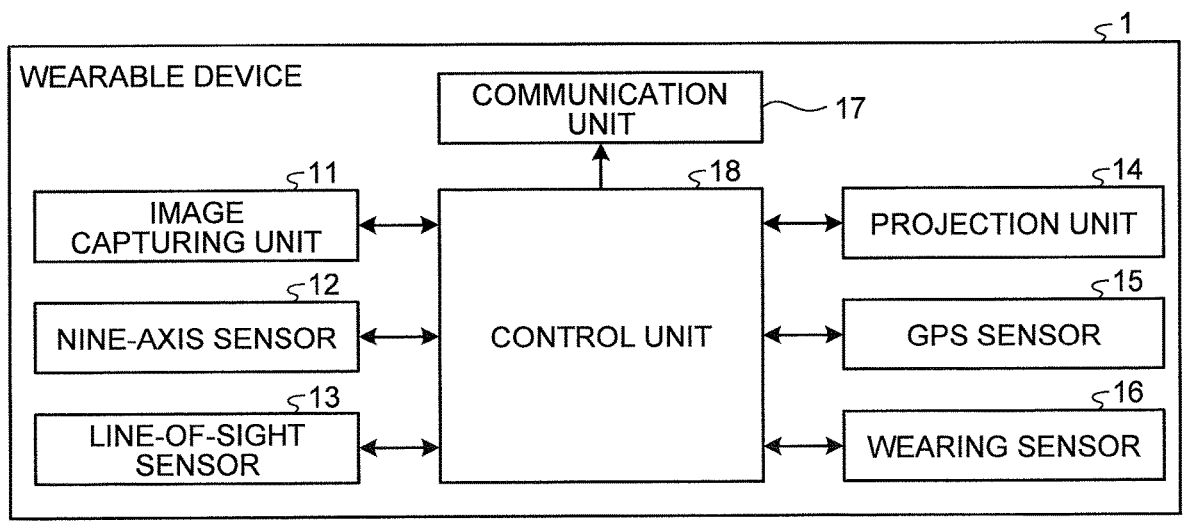
FIG. 3 is a block diagram illustrating a functional configuration of the wearable device according to the first embodiment.

FIG. 1 is a schematic view illustrating a schematic configuration of an assistance system according to a first embodiment. FIG. 2 illustrates a schematic configuration of a wearable device according to the first embodiment. FIG. 3 is a block diagram illustrating a functional configuration of the wearable device according to the first embodiment.

An assistance system 1000 illustrated in FIGS. 1 to 3 includes a wearable device 1 that a user U1 can wear and a server 2. The wearable device 1 and the server 2 are configured to enable mutual information communication via a base station 3 and a network 4. Also, the wearable device 1 receives a signal from a plurality of global positioning system (GPS) satellites 5 and calculates a position of the wearable device 1 itself based on the received signal. Also, the server 2 acquires via the base station 3 and the network 4 image data generated when the GPS satellite 5 captures from the air an image of the user U1 wearing the wearable device 1 and a surrounding area. Note that, in the first embodiment, the wearable device 1 functions as an assistance device.

Configuration of Wearable Device

First, a configuration of the wearable device 1 will be described. As illustrated in FIGS. 1 to 3, the wearable device 1 includes an image capturing unit 11, a nine-axis sensor 12, a line-of-sight sensor 13, a projection unit 14, a global positioning system (GPS) sensor 15, a wearing sensor 16, a communication unit 17, and a control unit 18. Although the nine-axis sensor 12 is used in the present example, the sensor may function less in a case in which a three-axis or six-axis sensor is sufficient.

Under control of the control unit 18, the image capturing unit 11 captures an image along a line of sight of a user, for example, to generate image data and outputs the image data to the control unit 18. The image capturing unit 11 includes an optical system including one or a plurality of lens(es) and a charge coupled device (CCD), a complementary metal oxide semiconductor (CMOS), or the like light-receiving an object image obtained by converging light by means of the optical system to generate image data. As illustrated in FIG. 2, a plurality of image capturing units 11 may be provided in the wearable device 1.

The nine-axis sensor 12 includes a three-axis gyro sensor, a three-axis acceleration sensor, and a three-axis geomagnetic sensor (compass). The nine-axis sensor 12 detects angular velocity and acceleration generated in the wearable device 1 and outputs the detection results to the control unit 18. The nine-axis sensor 12 also detects geomagnetism to detect an absolute direction and outputs the detection result to the control unit 18.

The line-of-sight sensor 13 detects a direction of a line of sight of a driver, who is a wearer of the wearable device 1, and outputs the detection result to the control unit 18. The line-of-sight sensor 13 includes an optical system, a CCD or a CMOS, a memory, and a processor including hardware such as a CPU and a GPU. With use of known template matching, for example, the line-of-sight sensor 13 detects an unmoving part of a driver's eye (for example, the inner corner of the eye) as a reference point and a moving part of the eye (for example, the iris) as a moving point and detects the direction of the line of sight of the driver based on a positional relationship between the reference point and the moving point.

The projection unit 14 projects image, video, and character information to a display unit (for example, a lens unit) of the wearable device or the retina of the driver under control of the control unit 18. The projection unit 14 includes RGB laser beams emitting R, G, and B laser beams, a MEMS mirror reflecting the laser beams, a reflection mirror projecting the laser beams reflected on the MEMS mirror to the retina of the driver, and the like.

The GPS sensor 15 calculates positional information about a position of the wearable device 1 based on signals received from the plurality of GPS satellites and outputs the calculated positional information to the control unit 18. The GPS sensor 15 includes a GPS reception sensor and the like.

The wearing sensor 16 detects a user's wearing state and outputs the detection result to the control unit 18. The wearing sensor 16 includes a pressure sensor detecting pressure when the user wears the wearable device 1, a vital sensor detecting vital information such as a body temperature, a pulse, brain waves, blood pressure, and a sweating state, and the like.

The communication unit 17 transmits various information to the server 2 and receives various information from the server 2 via the network 4 in conformity to predetermined communication standard under control of the control unit 18. The communication unit 17 includes a communication module enabling wireless communication.

The control unit 18 controls operations of the respective units included in the wearable device 1. The control unit 18 includes a memory and a processor including hardware such as a CPU. The control unit 18 acquires from the line-of-sight sensor 13 line-of-sight information about a line of sight of the user U1 wearing the wearable device 1 and, based on the line-of-sight information, generates and outputs to the projection unit 14 blind region state information indicating a state of a blind region shielded by a shielding object in a visual field region of the user U1. Meanwhile, in the first embodiment, the control unit 18 functions as a processor.

Configuration of Server

Next, a configuration of the server 2 will be described. The server 2 includes a communication unit 201 and a control unit 202.

The communication unit 201 transmits various information and receives various information via the network 4 and the base station 3 in conformity to predetermined communication standard under control of the control unit 202. The communication unit 201 also transmits various information to the wearable device 1 and receives various information from the GPS satellite 5 and the wearable device 1 in conformity to predetermined communication standard under control of the control unit 202. The communication unit 201 includes a communication module enabling wireless communication.

The control unit 202 includes a memory and a processor including some sort of hardware such as a CPU. The control unit 202 controls operations of the respective units included in the server 2.

Processing of Wearable Device

Figure 4:
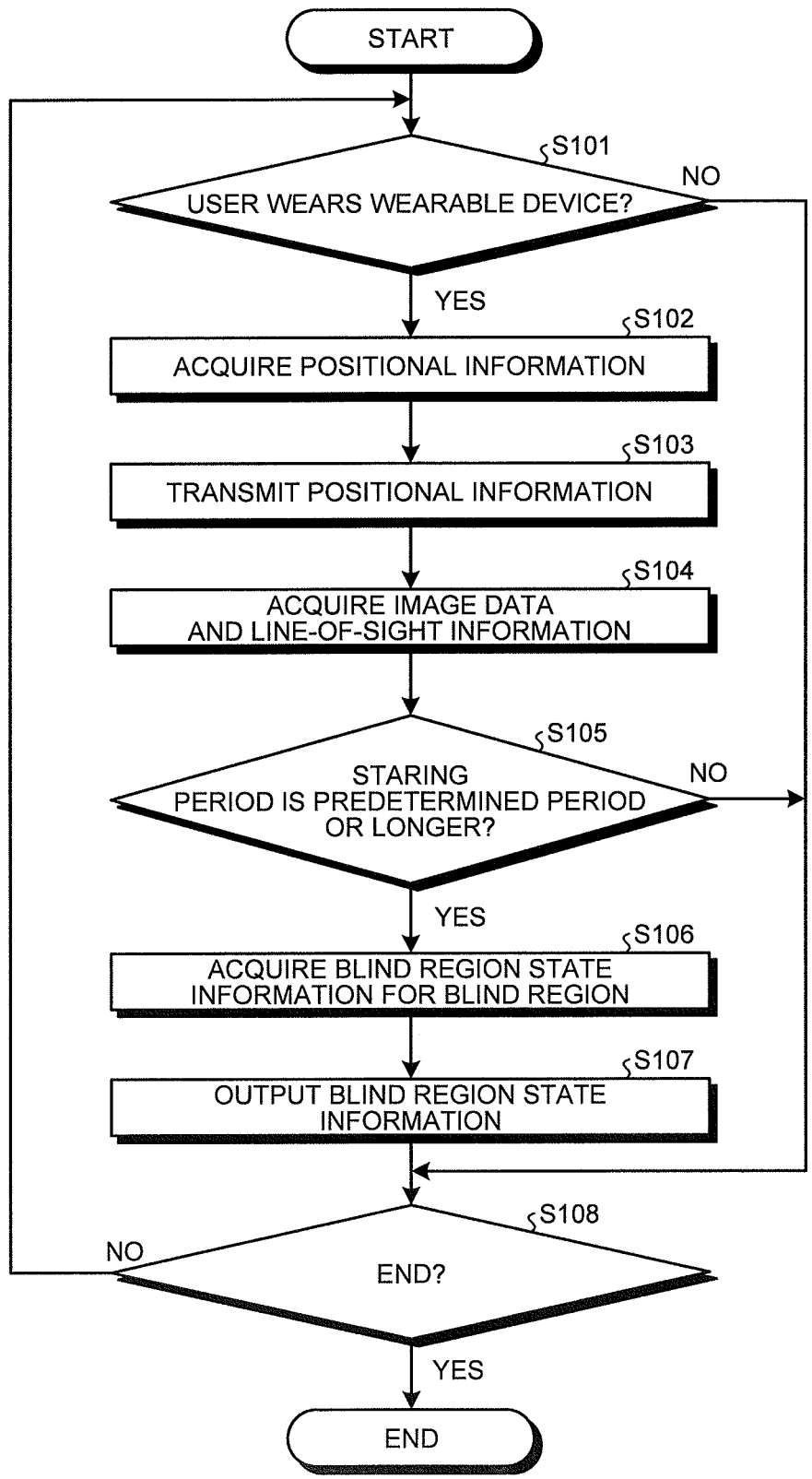
FIG. 4 is a flowchart illustrating an overview of processing executed by the wearable device according to the first embodiment.

Next, processing executed by the wearable device 1 will be described. FIG. 4 is a flowchart illustrating an overview of processing executed by the wearable device 1.

As illustrated in FIG. 4, the control unit 18 first determines whether or not the user U1 wears the wearable device 1 based on a detection result input from the wearing sensor 16 (Step S101). In a case in which it is determined by the control unit 18 that the user U1 wears the wearable device 1 (Step S101: Yes), the wearable device 1 moves to Step S102 described below.

Subsequently, the control unit 18 acquires positional information of the wearable device 1 detected by the GPS sensor 15 (Step S102) and transmits the positional information of the wearable device 1 via the communication unit 17 to the server 2 (Step S103).

The control unit 18 then acquires image data generated by the image capturing unit 11 and line-of-sight information about a line of sight of the user U1 from the line-of-sight sensor 13 (Step S104).

Figure 5:
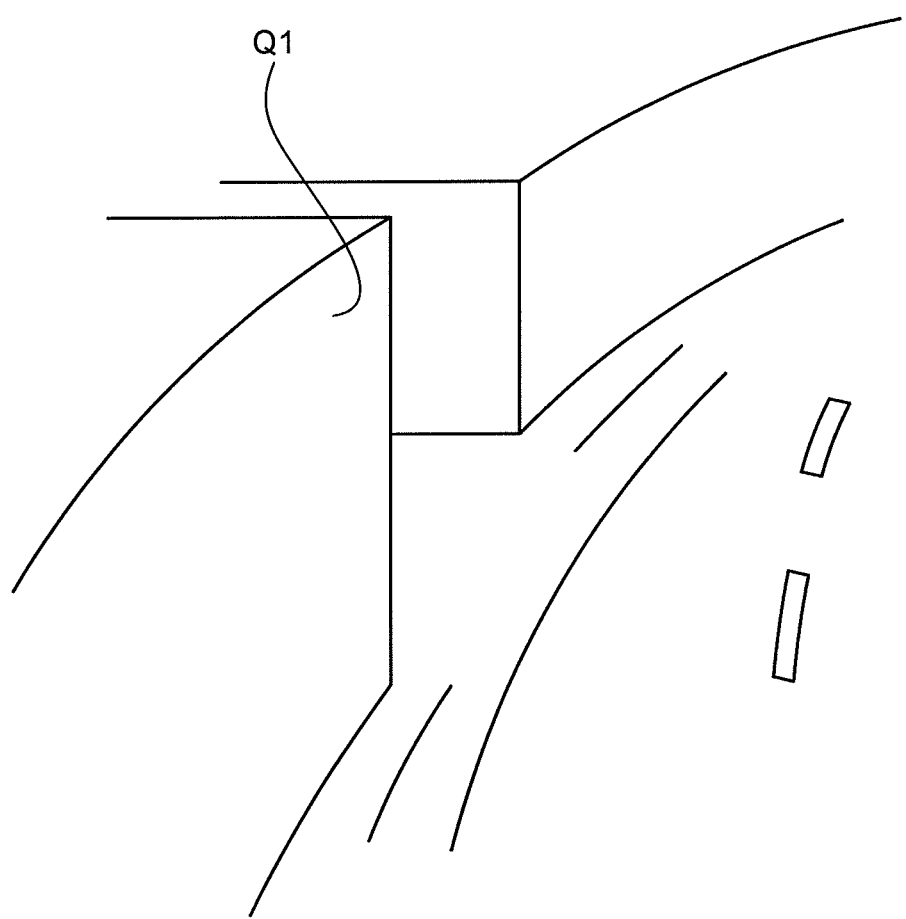
FIG. 5 schematically illustrates an example of a shielding object.

Subsequently, the control unit 18 determines whether or not the user U1 stares at a shielding object in a visual field region for a predetermined staring period or longer based on the image data generated by the image capturing unit 11 and the line-of-sight information acquired from the line-of-sight sensor 13 (Step S105). Specifically, as illustrated in FIG. 5, the control unit 18 detects a staring region of a shielding object Q1 which the user U1 stares at based on the image data generated by the image capturing unit 11 and the line-of-sight information acquired from the line-of-sight sensor 13. The control unit 18 then determines whether or not the staring period for which the user U1 stares at the staring region of the shielding object Q1 is a predetermined period or longer, such as one second to two seconds or longer. Here, the shielding object Q1 is a wall, a member, or the like shielding a blind region that the user U1 cannot visually recognize. Also, the blind region is a region or a space which is shielded by the shielding object Q1 and which the user. U1 cannot visually recognize. Also, the predetermined period can arbitrarily be changed in accordance with the operation of the user U1 and the walking speed of the user U1. In a case in which it is determined by the control unit 18 that the staring period for which the user U1 stares at the shielding object is the predetermined period or longer (Step S105: Yes), the wearable device 1 moves to Step S106 described below. Conversely, in a case in which it is determined by the control unit 18 that the staring period for which the user U1 stares at the shielding object is less than the predetermined period (Step S105: No), the wearable device 1 moves to Step S108 described below.

In Step S106, the control unit 18 acquires blind region state information indicating a state of the blind region shielded by the shielding object in the visual field region of the user U1 from the server 2 via the communication unit 17. Specifically, the control unit 18 acquires from the server 2 image data in the visual field direction of the user U1 defined by a detection result detected by the nine-axis sensor 12, that is, current image data captured from the air a current position of the wearable device 1 detected by the GPS sensor 15. Here, the current image data is image data acquired by the GPS satellite 5, for example.

Figure 6:
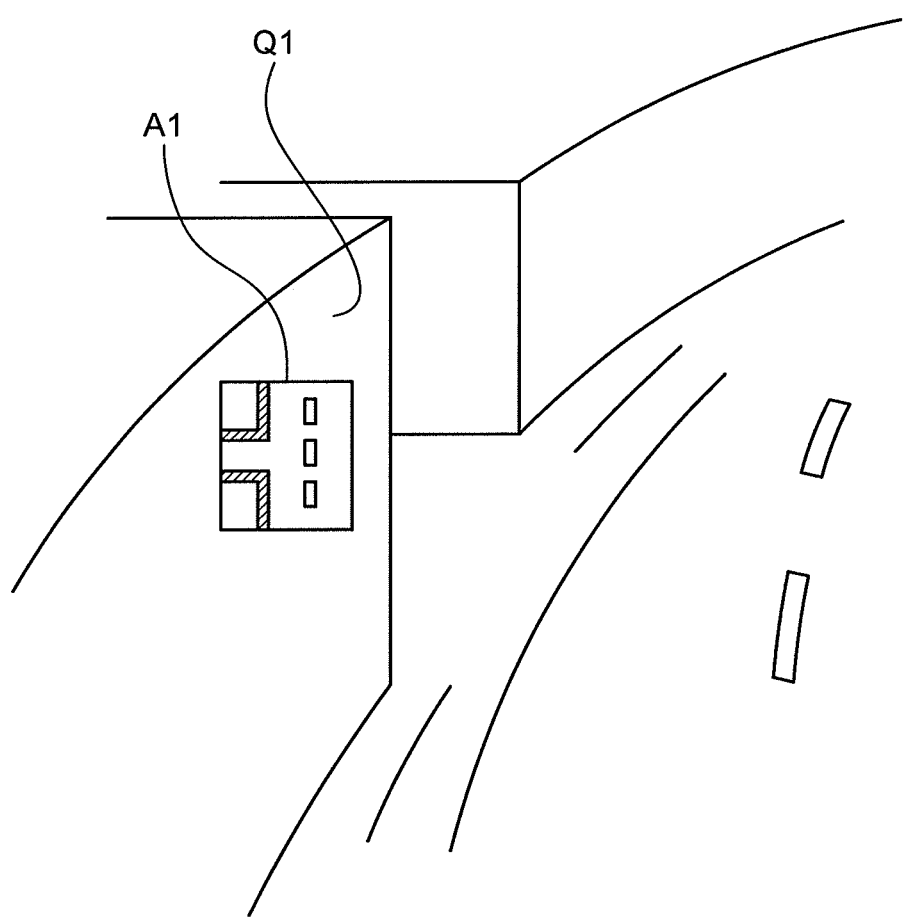
FIG. 6 schematically illustrates an example of blind region state information according to the first embodiment.

Subsequently, the control unit 18 outputs the blind region state information to the projection unit 14 so that the blind region state information may be displayed at a region corresponding to the line of sight of the user U1 (Step S107). Specifically, as illustrated in FIG. 6, the control unit 18 outputs to the projection unit 14 an image corresponding to the image data acquired from the server 2 so that blind region state information A1 may be displayed at the staring region of the shielding object Q1. Accordingly, since the blind region state information A1 is an image for the current state, the user U1 can intuitively grasp a state of the blind region behind the shielding object Q1.

Subsequently, the control unit 18 determines whether or not the user U1 takes off the wearable device 1 to end safety assistance by means of the wearable device 1 (Step S108). In a case in which it is determined by the control unit 18 that the user U1 ends the safety assistance by means of the wearable device 1 (Step S108: Yes), the wearable device 1 ends the processing. Conversely, in a case in which it is determined by the control unit 18 that the user U1 does not end the safety assistance by means of the wearable device 1 (Step S108: No), the wearable device 1 returns to Step S101 described above.

According to the first embodiment described above, since the control unit 18 outputs the image data acquired from the server 2 to the projection unit 14 so that the blind region state information A1 may be displayed at the shielding object Q1, the user U1 can intuitively grasp the state of the blind region behind the shielding object Q1.

Also, according to the first embodiment, since the control unit 18 outputs the blind region state information to the projection unit 14 so that the blind region state information may be displayed at the region corresponding to the line of sight of the user U1, and the blind region state information A1 is the image for the current state, the user U1 can intuitively grasp the state of the blind region behind the shielding object Q1.

Also, according to the first embodiment, in a case in which the staring period for which the user U1 stares at the shielding object Q1 is the predetermined period or longer, the control unit 18 outputs the blind region state information. Thus, the user can grasp the state of the blind region only when the user desires.

Second Embodiment

Next, a second embodiment will be described. An assistance system according to the second embodiment has an equal configuration to that of the assistance system 1000 according to the first embodiment and differs in terms of processing executed by the wearable device. Processing executed by the wearable device will be described below. Note that identical components to those in the assistance system 1000 according to the first embodiment described above are labeled with the same reference signs, and detailed description of the duplicate components is omitted.

Processing of Wearable Device

Figure 7:
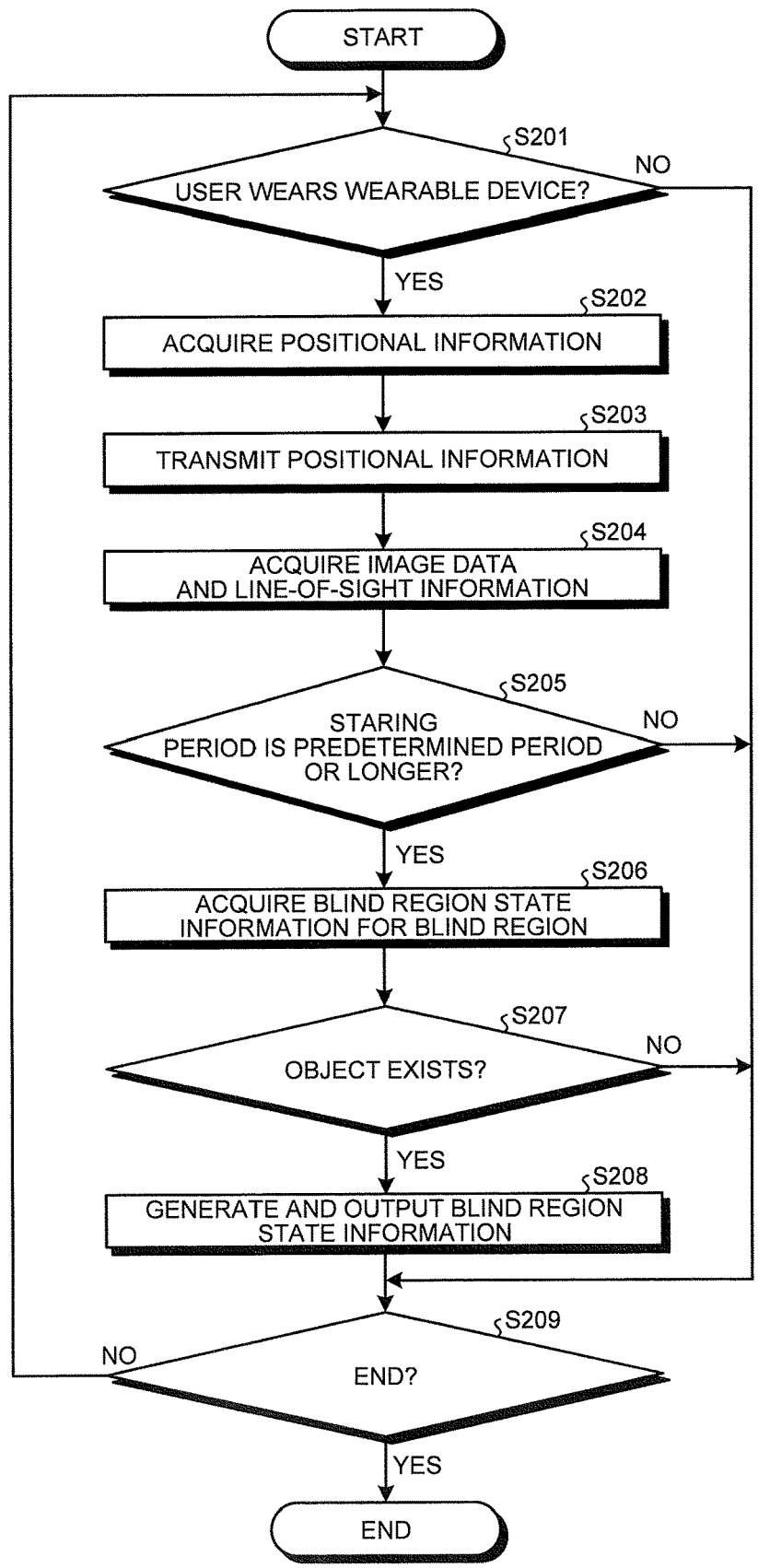
FIG. 7 is a flowchart illustrating an overview of processing executed by the wearable device according to a second embodiment.

FIG. 7 is a flowchart illustrating an overview of processing executed by the wearable device 1 according to the second embodiment. In FIG. 7, Steps S201 to S206 correspond to Steps S101 to S106 described above in FIG. 4, respectively.

In Step S207, the control unit 18 performs known pattern matching or the like to the image data acquired from the server 2 to determine whether or not there exists an object in the blind region. For example, the control unit 18 performs pattern matching or the like to an image corresponding to the image data acquired from the server 2 to determine whether or not there exists an object such as a person, a car, a bicycle, or an animal. In a case in which it is determined by the control unit 18 that there exists an object in the blind region (Step S207: Yes), the wearable device 1 moves to Step S208 described below. Conversely, in a case in which it is determined by the control unit 18 that there exists no object in the blind region (Step S207: No), the wearable device 1 moves to Step S209 described below.

Figure 8:
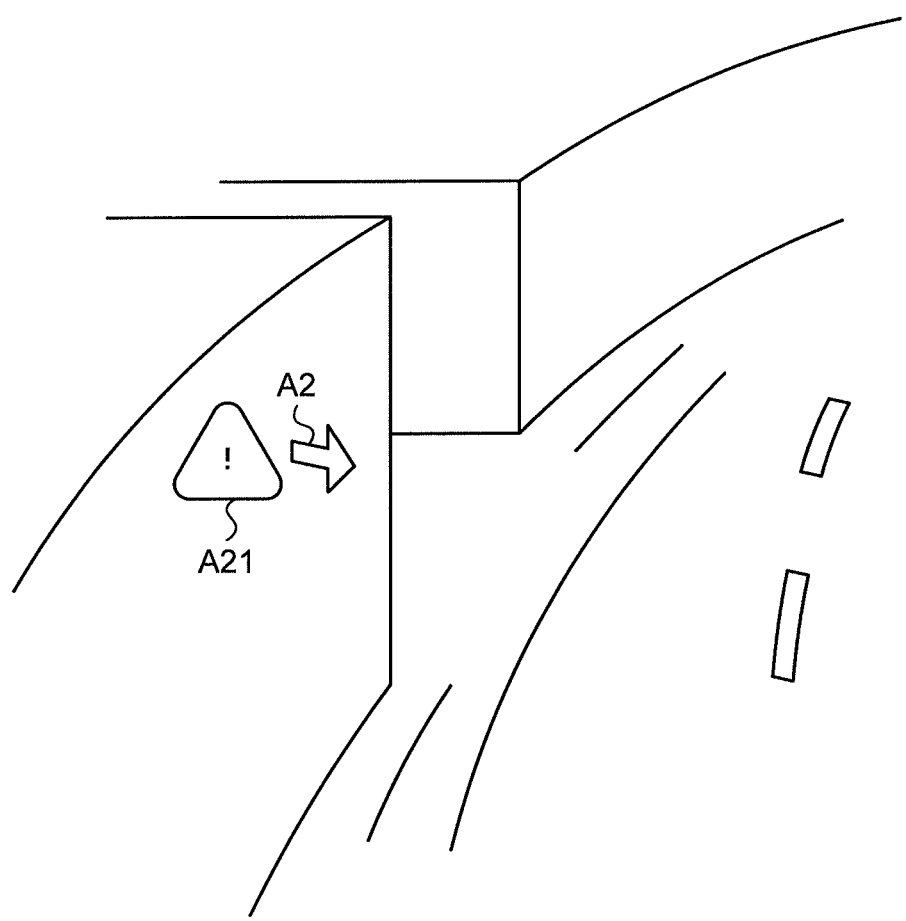
FIG. 8 schematically illustrates an example of blind region state information according to the second embodiment.

In Step S208, the control unit 18 outputs blind region state information to the projection unit 14 so that the blind region state information may be displayed at the staring region of the shielding object Q1. Specifically, as illustrated in FIG. 8, the control unit 18 outputs blind region state information A2 and A21 to the projection unit 14 so that blind region state information A2 and A21 may be displayed at the staring region of the shielding object Q1. Accordingly, since the user U1 can intuitively grasp the blind region state information A2 and A21, the user U1 can grasp existence of an object in the blind region behind the shielding object Q1. Meanwhile, although the arrow icon and the mark icon are output as the blind region state information A2 and A21 in FIG. 8, a graphic, a symbol, a color, a message, or the like corresponding to the object, such as a person-shaped icon or a message in a case of a person, may be output instead of the arrow and the mark. As a matter of course, the control unit 18 may output a sound by means of a not-illustrated loudspeaker or the like at the same time as output of the blind region state information A2.

Subsequently, the control unit 18 determines whether or not the user U1 takes off the wearable device 1 to end safety assistance by means of the wearable device 1 (Step S209). In a case in which it is determined by the control unit 18 that the user U1 ends the safety assistance by means of the wearable device 1. (Step S209: Yes), the wearable device 1 ends the processing. Conversely, in a case in which it is determined by the control unit 18 that the user U1 does not end the safety assistance by means of the wearable device 1 (Step S209: No), the wearable device 1 returns to Step S201 described above.

According to the second embodiment described above, since the control unit 18 outputs the blind region state information A2 to the projection unit 14 so that the blind region state information A2 may be displayed at the staring region of the shielding object Q1, the user U1 can intuitively grasp the blind region state information A2 and can thus grasp existence of an object in the blind region behind the shielding object Q1.

Third Embodiment

Next, a third embodiment will be described. An assistance system according to the third embodiment has an equal configuration to that of the assistance system 1000 according to the first embodiment and differs in terms of processing executed by the wearable device. Processing executed by the wearable device will be described below. Note that identical components to those in the assistance system 1000 according to the first embodiment described above are labeled with the same reference signs, and detailed description of the duplicate components is omitted.

Processing of Wearable Device

Figure 9:
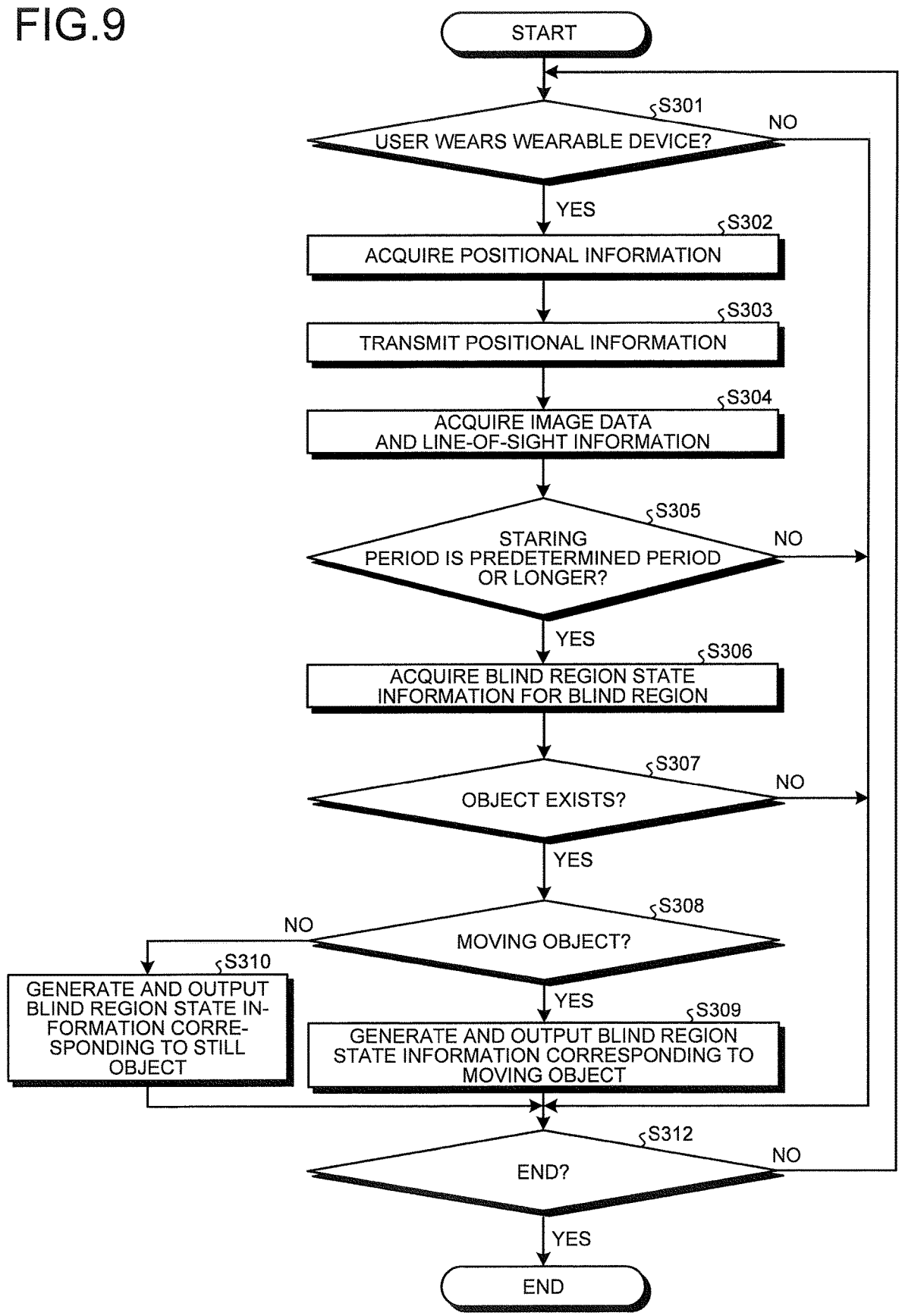
FIG. 9 is a flowchart illustrating an overview of processing executed by the wearable device according to a third embodiment.

FIG. 9 is a flowchart illustrating an overview of processing executed by the wearable device 1 according to the third embodiment. In FIG. 9, Steps S301 to S306 correspond to Steps S101 to S106 described above in FIG. 4, respectively.

In Step S307, the control unit 18 performs known pattern matching or the like to the image data acquired from the server 2 to determine whether or not there exists an object in the blind region. In a case in which it is determined by the control unit 18 that there exists an object in the blind region (Step S307: Yes), the wearable device 1 moves to Step S308 described below. Conversely, in a case in which it is determined by the control unit 18 that there exists no object in the blind region (Step S307: No), the wearable device 1 moves to Step S312 described below.

In Step S308, the control unit 18 determines whether or not the object existing in the blind region is a moving object. Specifically, the control unit 18 uses at least two chronologically-adjacent image data pieces acquired from the server 2 to calculate the moving amount of the object, such as a moving vector of the object, and determines whether or not the calculated moving amount is a predetermined value or higher. Here, the moving object is an object moving at certain speed such as a child, an animal, a pedestrian, a bicycle, a motorcycle, and a vehicle. In a case in which it is determined by the control unit 18 that the object existing in the blind region is a moving object (Step S308: Yes), the wearable device 1 moves to Step S309 described below. Conversely, in a case in which it is determined by the control unit 18 that the object existing in the blind region is not a moving object (Step S308: No), the wearable device 1 moves to Step S310 described below.

Figure 10:
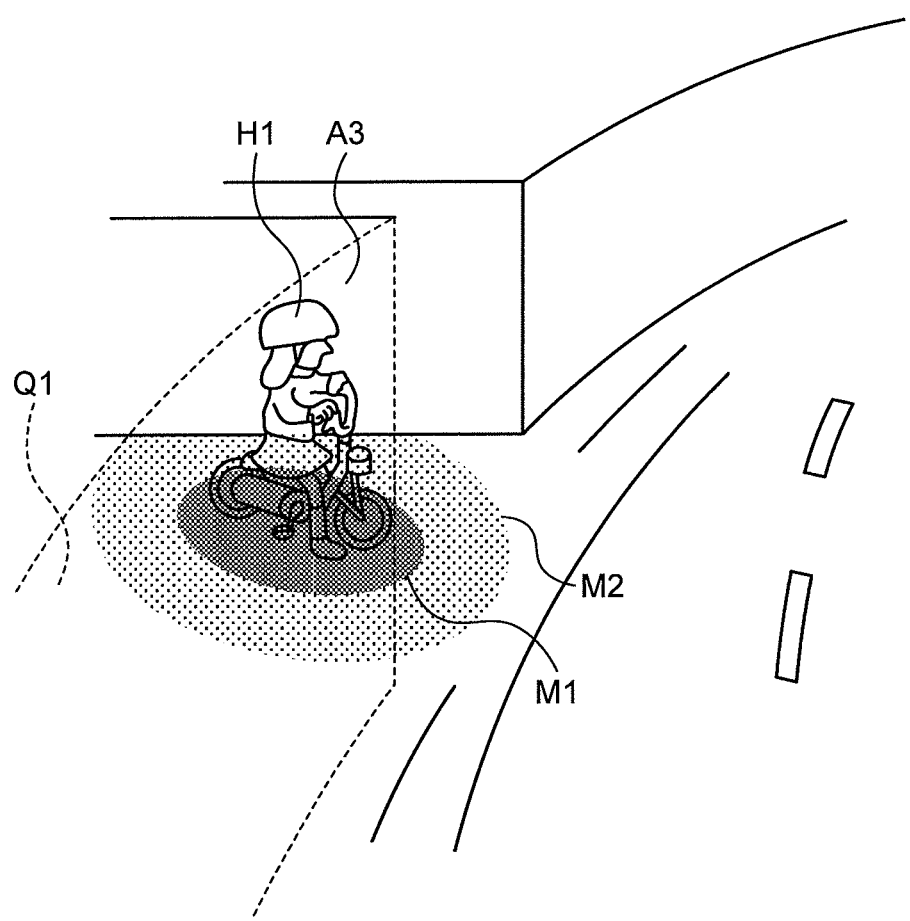
FIG. 10 schematically illustrates an example of blind region state information according to the third embodiment.

In Step S309, the control unit 18 outputs blind region state information corresponding to the moving object to the projection unit 14 based on the image data generated by the image capturing unit 11 and the image data acquired from the server 2. Specifically, as illustrated in FIG. 10, the control unit 18 outputs to the projection unit 14 a synthetic image corresponding to synthetic image data obtained by synthesizing the image data generated by the image capturing unit 11 with the image data of the blind region acquired from the server 2 at a predetermined ratio (for example, 5:5) so that the synthetic image may be displayed at the staring region of the shielding object Q1. Accordingly, since the blind region behind the shielding object Q1 is displayed in a virtually semi-transmissive state, the user U1 can grasp the current state of the blind region without feeling strange. Also, in a case in which the control unit 18 detects a moving object H1 such as a child as a result of known pattern matching or the like to the image data of the blind region acquired from the server 2, the control unit 18 outputs to the projection unit 14 marks M1 and M2 so that the marks M1 and M2 may be displayed around the moving object H1. At this time, the control unit 18 calculates speed of the moving object H1 and walking speed of the user U1 wearing the wearable device 1 with use of at least two chronologically-adjacent image data pieces acquired from the server 2 and calculates the degree of urgency based on relative speed between the moving object H1 and the wearable device 1 and traveling directions of the moving object H1 and the user U1 wearing the wearable device 1. The control unit 18 then outputs the marks M1 and M2 to the projection unit 14 so that ways to display the marks M1 and M2 may be changed in accordance with the degree of urgency, e.g., so that the marks M1 and M2 may be displayed in red or yellow in accordance with the degree of urgency. Accordingly, since the user U1 can intuitively grasp blind region state information A3, the user U1 can grasp a state of the moving object H1 hidden behind the shielding object Q1. Further, since the user U1 can grasp speed of the moving object H1 based on the states of the marks M1 and M2, the user U1 can predict time until an encounter with the moving object H1. Note that, although the control unit 18 performs the synthesis at a synthetic ratio of 5:5 in FIG. 10, the synthetic ratio is not limited to this and can arbitrarily be changed. Also, the control unit 18 is not required to express the moving object H1 in the blind region state information A3 accurately and may express the moving object H1 with use of a simple graphic, such as an icon and an avatar, in accordance with processing speed for image generation. After Step S309, the wearable device 1 moves to Step S312 described below.

In Step S310, the control unit 18 outputs blind region state information corresponding to a still object to the projection unit 14 based on the image data acquired from the server 2. Specifically, the control unit 18 outputs the blind region state information A2 (refer to FIG. 8 described above) to the projection unit 14 so that the blind region state information A2 may be displayed at a region corresponding to the shielding object Q1. Accordingly, since the user U1 can intuitively grasp the blind region state information A2, the user U1 can grasp existence of an object in the blind region behind the shielding object Q1. After Step S310, the wearable device 1 moves to Step S312 described below.

Subsequently, the control unit 18 determines whether or not the user U1 takes off the wearable device 1 to end safety assistance by means of the wearable device 1 (Step S312). In a case in which it is determined by the control unit 18 that the user U1 ends the safety assistance by means of the wearable device 1 (Step S312: Yes), the wearable device 1 ends the processing. Conversely, in a case in which it is determined by the control unit 18 that the user U1 does not end the safety assistance by means of the wearable device 1 (Step S312: No), the wearable device 1 returns to Step S301 described above.

According to the third embodiment described above, since the blind region behind the shielding object Q1 is displayed in a virtually semi-transmissive state, the user U1 can intuitively grasp the blind region state information A3, and the user U1 can thus grasp the state of the moving object H1 hidden behind the shielding object Q1 without feeling strange.

Also, according to the third embodiment, since the control unit 18 outputs the marks M1 and M2 to the projection unit 14 so that ways to display the marks M1 and M2 may be changed in accordance with the relative speed between the moving object H1 and the wearable device 1, the user U1 can intuitively grasp the blind region state information A3, and the user U1 can thus grasp the state of the moving object H1 hidden behind the shielding object Q1.

Also, according to the third embodiment, since the control unit 18 generates blind region state information with use of image data and outputs the blind region state information to the wearable device 1, the user can grasp the current state in the blind region.

Modification Example of Third Embodiment

Figure 11:
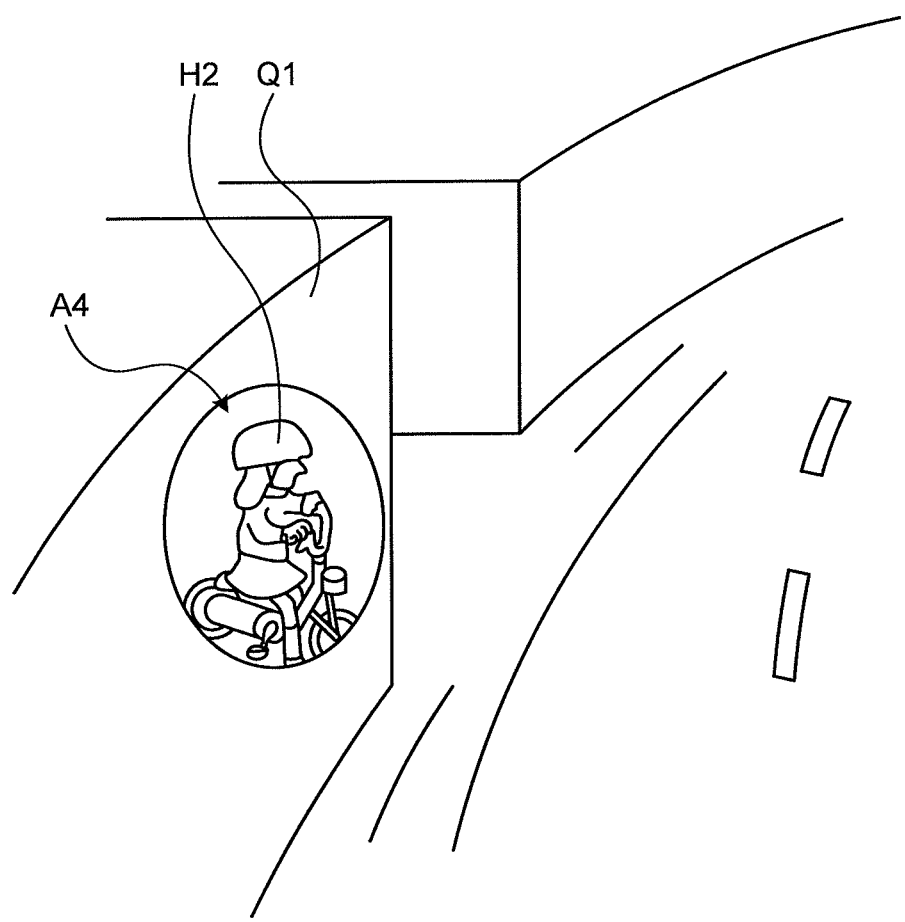
FIG. 11 schematically illustrates an example of blind region state information that a control unit outputs to a projection unit according to a modification example of the third embodiment.

Next, a modification example of the third embodiment will be described. FIG. 11 schematically illustrates an example of blind region state information that the control unit 18 outputs to the projection unit 14 according to the modification example of the third embodiment.

As illustrated in FIG. 11, the control unit 18 generates image data including an opening portion obtained by virtually hollowing a predetermined region including the staring region of the shielding object Q1 based on the image data for the blind region acquired from the server 2 and the line-of-sight information detected by the line-of-sight sensor 13 and outputs an image corresponding to the image data as blind region state information A4 to the projection unit 14. Accordingly, since the blind region behind the shielding object Q1 is displayed in a state in which the region including the staring region of the shielding object Q1 which the user U1 stares at is hollowed, the user U1 can grasp the current state of the blind region without feeling strange. Further, the control unit 18 may calculate the degree of urgency based on relative speed between a moving object H2 and the user U1 wearing the wearable device 1 and traveling directions of the moving object H2 and the user U1 wearing the wearable device 1 and circle the opening portion with an arbitrary color in accordance with the degree of urgency, e.g., with green, yellow, or red in accordance with the degree of urgency.

According to the modification example of the third embodiment described above, since the blind region behind the shielding object Q1 is displayed in a state in which the staring region of the shielding object Q1 which the user U1 stares at is hollowed, the user U1 can grasp the current state of the blind region without feeling strange.

Fourth Embodiment

Next, a fourth embodiment will be described. In the aforementioned first to third embodiments, the wearable device 1 acquires image data via the network 4 from the server 2. In an assistance system according to the fourth embodiment, an electronic control unit (ECU) provided in a vehicle outputs blind region state information to the wearable device in cooperation with the wearable device, and the wearable device projects and displays the blind region state information. Note that identical components to those in the assistance system 1000 according to the first embodiment described above are labeled with the same reference signs, and detailed description of the duplicate components is omitted.

Configuration of Assistance System

Figure 12:
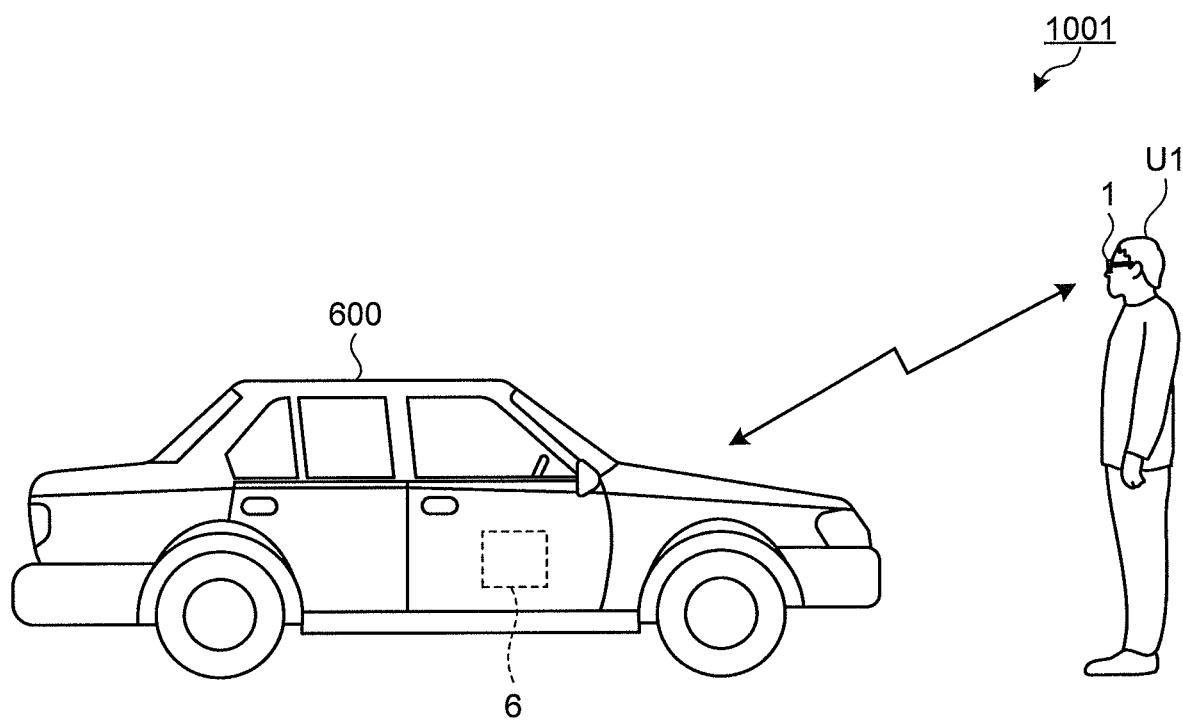
FIG. 12 illustrates a schematic configuration of an assistance system according to a fourth embodiment.
Figure 13:
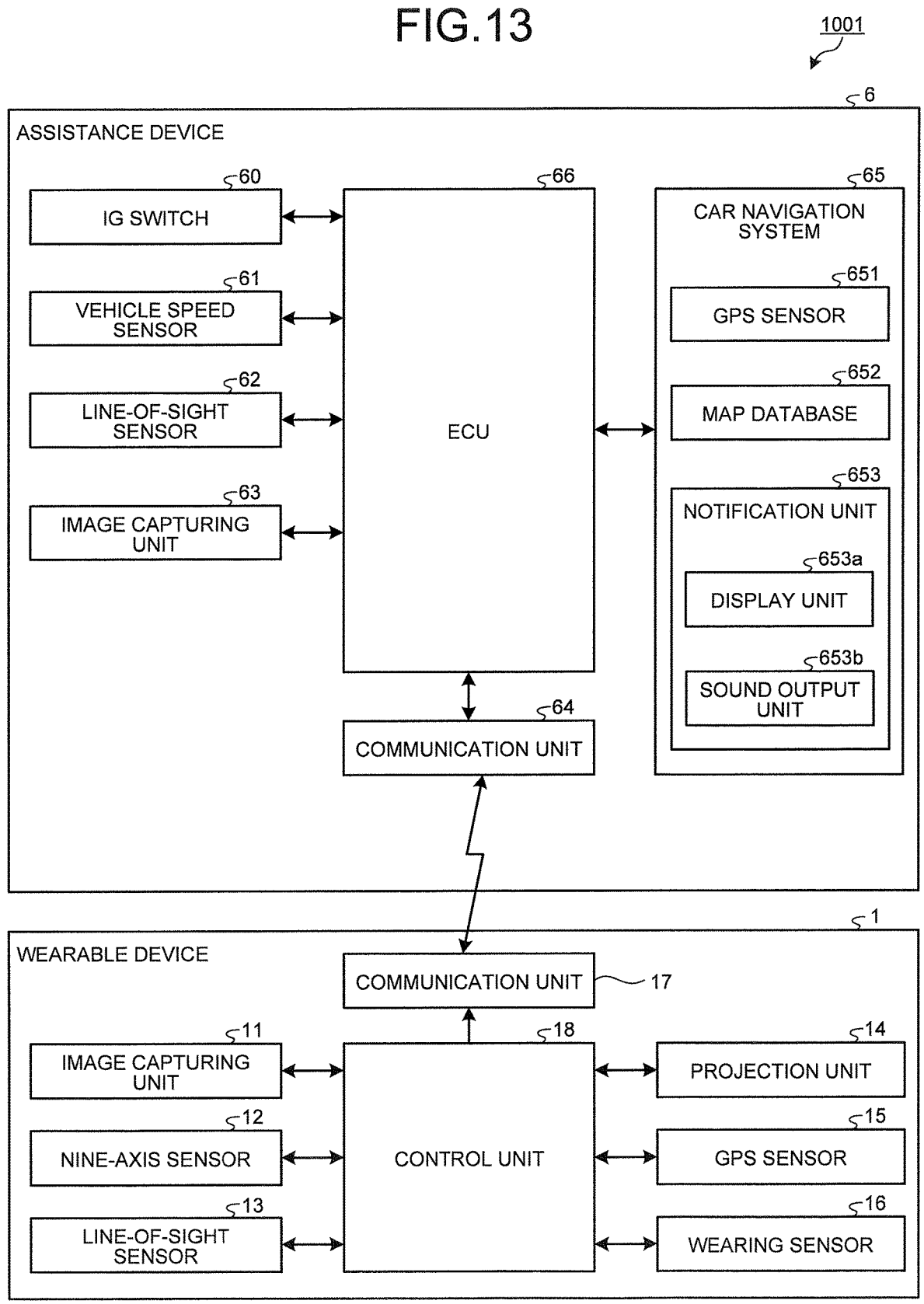
FIG. 13 is a block diagram illustrating a functional configuration of the assistance system according to the fourth embodiment.

FIG. 12 illustrates a schematic configuration of the assistance system according to the fourth embodiment. FIG. 13 is a block diagram illustrating a functional configuration of the assistance system according to the fourth embodiment.

An assistance system 1001 illustrated in FIGS. 12 and 13 includes the wearable device 1 and an assistance device 6 performing two-way communication with the wearable device 1 in conformity to predetermined communication standard.

Configuration of Assistance Device

Next, a configuration of the assistance device 6 will be described. The assistance device 6 illustrated in FIGS. 12 and 13 is mounted in a vehicle 600 and assists safety of a driver in the vehicle 600 at the time of driving and at the time of parking in cooperation with another ECU mounted in the vehicle 600. The assistance device 6 includes an ignition switch 60 (hereinbelow referred to as "an IG switch 60"), a vehicle speed sensor 61, a line-of-sight sensor 62, an image capturing unit 63, a communication unit 64, a car navigation system 65, and an ECU 66.

The IG switch 60 accepts start and stop of electric systems such as an engine and a motor. The IG switch 60 starts an IG power supply in a case in which the IG switch 60 is in an on state and stops the IG power supply in a case in which the IG switch 60 is in an off state.

The vehicle speed sensor 61 detects vehicle speed when the vehicle 600 is running and outputs the detection result to the ECU 66.

The line-of-sight sensor 62 detects a line of sight of the driver and outputs the detection result to the ECU 66. The line-of-sight sensor 62 includes an optical system, a CCD or a CMOS, a memory, and a processor including hardware such as a CPU and a GPU. With use of known template matching, for example, the line-of-sight sensor 62 detects an unmoving part of a driver's eye (for example, the inner corner of the eye) as a reference point and a moving part of the eye (for example, the iris) as a moving point and detects the line of sight of the driver based on a positional relationship between the reference point and the moving point. Note that, although the line of sight of the driver is detected using a visible camera as the line-of-sight sensor 62 in the fourth embodiment, the disclosure is not limited to this, and the line of sight of the driver may be detected using an infrared camera. In a case in which the infrared camera is used as the line-of-sight sensor 62, infrared light is emitted to the driver by means of an infrared light emitting diode (LED) or the like, a reference point (for example, the corneal reflection) and a moving point (for example, the pupil) are detected from image data generated by capturing an image of the driver with use of the infrared camera, and the line of sight of the driver is detected based on a positional relationship between the reference point and the moving point.

As illustrated in FIG. 12, a plurality of image capturing units 63 are provided outside the vehicle 600 at three or more locations including at least a front lateral side, a rear side, and both lateral sides so that an image capturing viewing angle may be 360°, for example. Under control of the ECU 66, the image capturing unit 63 captures an image of a periphery of the vehicle 600 to generate image data and outputs the image data to the ECU 66. The image capturing unit 63 includes an optical system including one or a plurality of lens(es) and a CCD, a CMOS, or the like light-receiving an object image obtained by converging light by means of the optical system to generate image data.

The communication unit 64 transmits various information to the wearable device 1, another vehicle, a user terminal device, or the like and receives various information from the wearable device 1, another vehicle, the user terminal device, or the like in conformity to predetermined communication standard under control of the ECU 66. The communication unit 64 also transmits various information to a not-illustrated server and receives various information from the server via a network in conformity to predetermined communication standard under control of the ECU 66. The communication unit 64 includes a communication module enabling wireless communication.

The car navigation system 65 includes a GPS sensor 651, a map database 652, and a notification unit 653.

The GPS sensor 651 receives a signal from a plurality of GPS satellites and transmission antennae and calculates a position of the vehicle 600 based on the received signal. The GPS sensor 651 includes a GPS reception sensor and the like. Note that a plurality of GPS sensors 651 may be mounted to improve direction accuracy of the vehicle 600.

The map database 652 stores various kinds of map data. The map database 652 may include a recording medium such as a hard disk drive (HDD) and a solid state drive (SSD).

The notification unit 653 may include a display unit 653a displaying image, video, and character information, a sound output unit 653b generating a sound such as a voice and a warning sound, a conduction unit conducting a sound by means of bone conduction, and the like. The display unit 653a includes a display such as a liquid crystal display and an organic electroluminescence (EL) display. The sound output unit 653b includes a loudspeaker.

The car navigation system 65 configured as above superimposes a current position of the vehicle 600 acquired by the GPS sensor 651 on the map data stored in the map database 652 to notify the driver of information including a road on which the vehicle 600 is currently traveling, a route to a destination, and the like by means of the display unit 653a and the sound output unit 653b.

The ECU 66 controls operations of the respective units included in the assistance device 6. The ECU 66 includes a memory and a processor including hardware such as a CPU. The ECU 66 acquires line-of-sight information about a line of sight of the user U1 wearing the wearable device 1 and, based on the line-of-sight information, generates and outputs to the projection unit 14 blind region state information indicating a state of a blind region shielded by a shielding object in a visual field region of the user U1. Meanwhile, in the fourth embodiment, the ECU 66 functions as a processor.

Processing of Assistance Device

Figure 14:
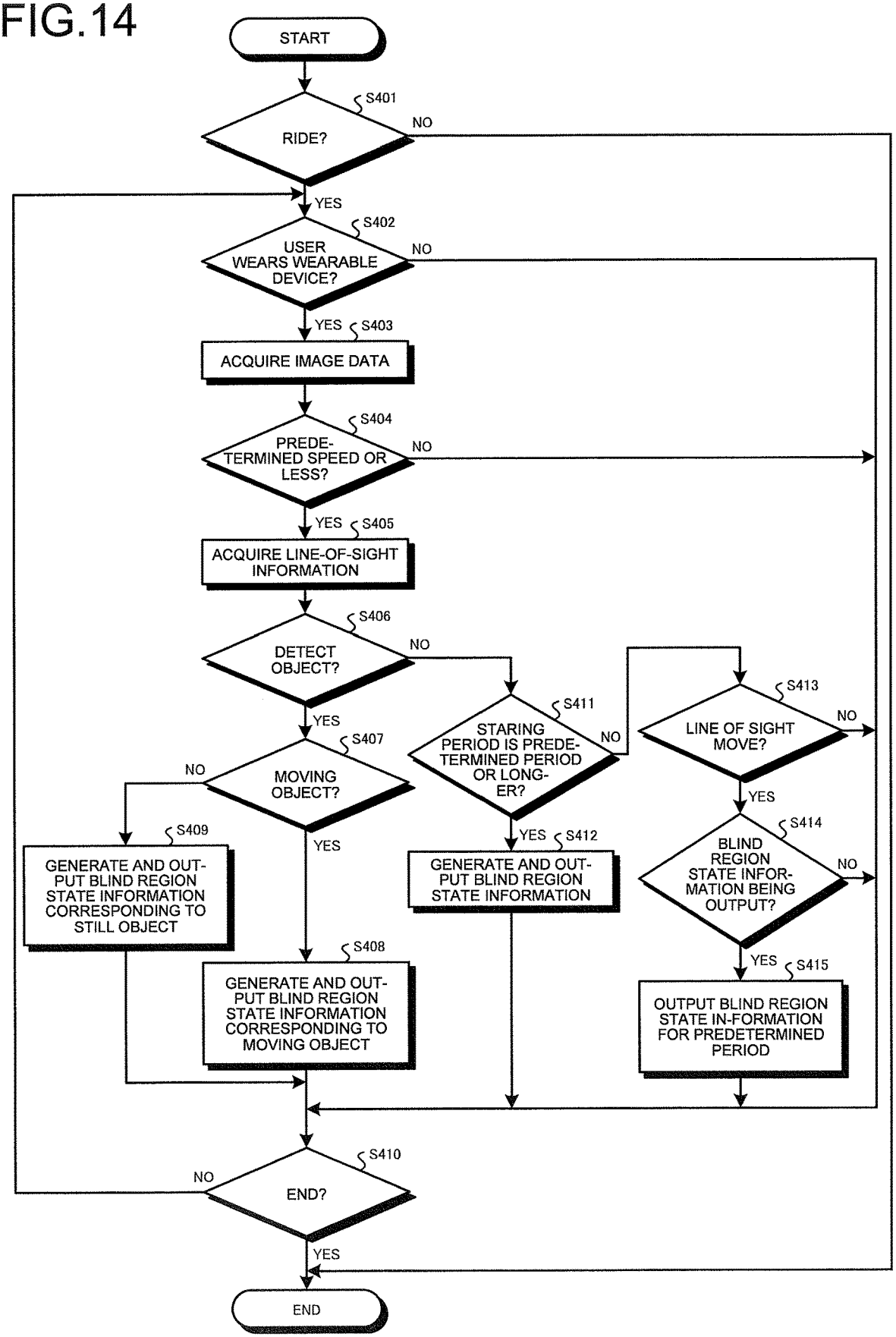
FIG. 14 is a flowchart illustrating an overview of processing executed by an assistance device according to the fourth embodiment.

Next, processing executed by the assistance device 6 will be described. FIG. 14 is a flowchart illustrating an overview of processing executed by the assistance device 6.

As illustrated in FIG. 14, the ECU 66 determines whether or not the user U1 has ridden the vehicle 600 (Step S401). For example, the ECU 66 calculates a distance between the vehicle 600 and the wearable device 1 based on positional information detected by the GPS sensor 15 of the wearable device 1 via the communication unit 64 and positional information detected by the GPS sensor 651 of the car navigation system 65 to determine whether or not the calculated distance is less than a predetermined value and determines that the user U1 has ridden the vehicle 600 in a case in which the distance is less than the predetermined value. In a case in which it is determined by the ECU 66 that the driver has ridden the vehicle 600 (Step S401: Yes), the assistance device 6 moves to Step S402 described below. Conversely, in a case in which it is determined by the ECU 66 that the user U1 has not ridden the vehicle 600 (Step S401: No), the assistance device 6 ends the processing.

In Step S402, the ECU 66 determines whether or not the user U1 wears the wearable device 1. Specifically, the ECU 66 receives a wearing signal indicating a detection result from the wearing sensor 16 of the wearable device 1 via the communication unit 64 and determines whether or not the user U1 wears the wearable device 1 based on the received wearing signal. In a case in which it is determined by the ECU 66 that the user U1 wears the wearable device 1 (Step S402: Yes), the assistance device 6 moves to Step S403 described below. Conversely, in a case in which it is determined by the ECU 66 that the user U1 does not wear the wearable device 1 (Step S402: No), the assistance device 6 moves to Step S407 described below.

In Step S403, the ECU 66 acquires vehicle speed information about vehicle speed of the vehicle 600 from the vehicle speed sensor 61, line-of-sight information about a line of sight of the user U1 riding the vehicle 600 from the line-of-sight sensor 62, and image data from the image capturing unit 63.

Subsequently, the ECU 66 determines based on the vehicle speed information acquired from the vehicle speed sensor 61 whether or not the vehicle speed of the vehicle 600 is equal to or less than predetermined speed (Step S404). For example, the ECU 66 determines whether or not the vehicle speed of the vehicle 600 is 10 km/h. Note that the predetermined speed can arbitrarily be set. In a case in which it is determined by the ECU 66 that the vehicle speed of the vehicle 600 is equal to or less than the predetermined speed (Step S404: Yes), the assistance device 6 moves to Step S405 described below. Conversely, in a case in which it is determined by the ECU 66 that the vehicle speed of the vehicle 600 is not equal to or less than the predetermined speed (Step S404: No), the assistance device 6 moves to Step S410 described below.

In Step S405, the ECU 66 acquires line-of-sight information about a line of sight of the user U1 from the line-of-sight sensor 62.

Subsequently, the ECU 66 performs known pattern matching or the like to an image corresponding to the image data acquired from the image capturing unit 63 to determine whether or not there exists an object in a blind region of the vehicle 600 (Step S406). In a case in which it is determined by the ECU 66 that there exists an object in the blind region of the vehicle 600 (Step S406: Yes), the assistance device 6 moves to Step S407 described below. Conversely, in a case in which it is determined by the ECU 66 that there exists no object in the blind region of the vehicle 600 (Step S406: No), the assistance device 6 moves to Step S411 described below.

In Step S407, the ECU 66 determines whether or not the object existing in the blind region is a moving object. In a case in which it is determined by the ECU 66 that the object existing in the blind region is a moving object (Step S407: Yes), the assistance device 6 moves to Step S408 described below. Conversely, in a case in which it is determined by the ECU 66 that the object existing in the blind region is not a moving object (Step S407: No), the assistance device 6 moves to Step S409 described below.

Figure 15:
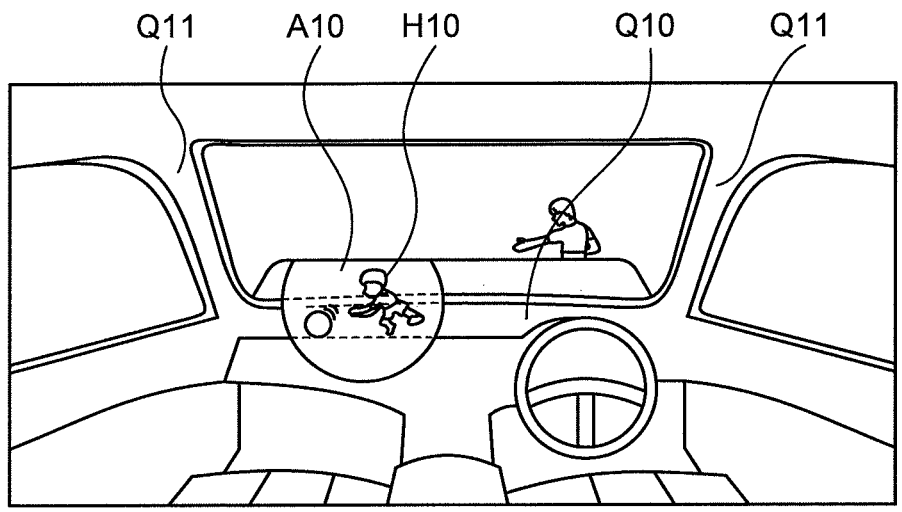
FIG. 15 schematically illustrates an example of blind region state information according to the fourth embodiment.

In Step S408, the ECU 66 generates and outputs blind region state information corresponding to the moving object based on the image data of the blind region acquired from the image capturing unit 63. Specifically, as illustrated in FIG. 15, the ECU 66 generates image data including an opening portion obtained by virtually hollowing a region of the blind region in which a moving object H10 exists, such as a predetermined region including a portion of shielding objects Q10 and Q11 such as an instrument panel and a front pillar. The ECU 66 then outputs blind region state information A10 corresponding to the image data to the wearable device 1. Accordingly, since the blind region state information A10 behind the shielding object Q10 is displayed, the user U1 can intuitively grasp a state of the blind region without feeling strange. In this case, the ECU 66 calculates speed of the moving object with use of at least two chronologically-adjacent image data pieces acquired from the image capturing unit 63, acquires speed of the vehicle 600 acquired from the vehicle speed sensor 61, calculates relative speed between the moving object and the vehicle 600 (subject vehicle) and traveling directions of the moving object and the vehicle 600, and calculates the degree of urgency based on the relative speed between the moving object and the vehicle 600 (subject vehicle) and the traveling directions of the moving object and the vehicle 600. Based on the degree of urgency, the ECU 66 may output the aforementioned marks M1 and M2 in accordance with the degree of urgency as in FIG. 10 to the wearable device 1 so that the marks M1 and M2 may be displayed. After Step S408, the assistance device 6 moves to Step S410 described below.

In Step S409, the ECU 66 generates and outputs blind region state information corresponding to a still object based on the image data of the blind region acquired from the image capturing unit 63. Specifically, the ECU 66 generates blind region state information (for example, the icon in FIG. 8 or the like) corresponding to the still object based on the image data of the blind region acquired from the image capturing unit 63. The ECU 66 then outputs the blind region state information to the wearable device 1 so that the blind region state information may be displayed at a region of the shielding object Q10 at which the object exists. After Step S409, the assistance device 6 moves to Step S410 described below.

In Step S410, in a case in which it is determined by the ECU 66 that the IG switch 60 is turned off to end driving of the vehicle 600 (Step S410: Yes), the assistance device 6 ends the processing. Conversely, in a case in which it is determined by the ECU 66 that the IG switch 60 is not turned off, and that driving of the vehicle 600 is not ended (Step S410: No), the assistance device 6 returns to Step S402 described above.

In Step S411, the ECU 66 determines based on the line-of-sight information about the line of sight of the user U1 from the line-of-sight sensor 62 whether or not the staring period for which the user U1 stares at a predetermined region of the vehicle 600, such as the front pillar, is a predetermined period (for example, two seconds) or longer (Step S411). In a case in which it is determined by the ECU 66 that the staring period for which the user U1 stares at the predetermined region of the vehicle 600 is the predetermined period or longer (Step S411: Yes), the assistance device 6 moves to Step S412 described below. Conversely, in a case in which it is determined by the ECU 66 that the staring period for which the user U1 stares at the predetermined region of the vehicle 600 is not the predetermined period or longer (Step S411: No), the assistance device 6 moves to Step S413 described below.

In Step S412, the ECU 66 outputs image data acquired from the image capturing unit 63 via the communication unit 64 as blind region state information to the wearable device 1 to project and display the blind region state information at the blind region behind the shielding object of the vehicle 600 on the wearable device 1. Specifically, similarly to FIG. 15 described above, the ECU 66 generates image data including an opening portion obtained by virtually hollowing the staring region of the shielding objects Q10 and Q11. The ECU 66 then outputs the blind region state information A10 corresponding to the image data to the wearable device 1 so that the blind region state information A10 may be displayed at the staring region at which the user U1 stares. Accordingly, since the blind region state information A10 behind the shielding object Q10 is displayed, the user U1 can intuitively grasp a state of the blind region without feeling strange. After Step S412, the assistance device 6 moves to Step S410.

In Step S413, the ECU 66 determines based on the line-of-sight information about the line of sight of the user U1 from the line-of-sight sensor 62 whether or not the line of sight of the user is moving. In a case in which it is determined by the ECU 66 that the line of sight of the user is moving (Step S413: Yes), the assistance device 6 moves to Step S414 described below. Conversely, in a case in which it is determined by the ECU 66 that the line of sight of the user is not moving (Step S413: No), the assistance device 6 moves to Step S410.

In Step S414, the ECU 66 determines whether or not the wearable device 1 is outputting the blind region state information. In a case in which it is determined by the ECU 66 that the wearable device 1 is outputting the blind region state information (Step S414: Yes), the assistance device 6 moves to Step S415 described below. Conversely, in a case in which it is determined by the ECU 66 that the wearable device 1 is not outputting the blind region state information (Step S414: No), the assistance device 6 moves to Step S410.

Figure 16:
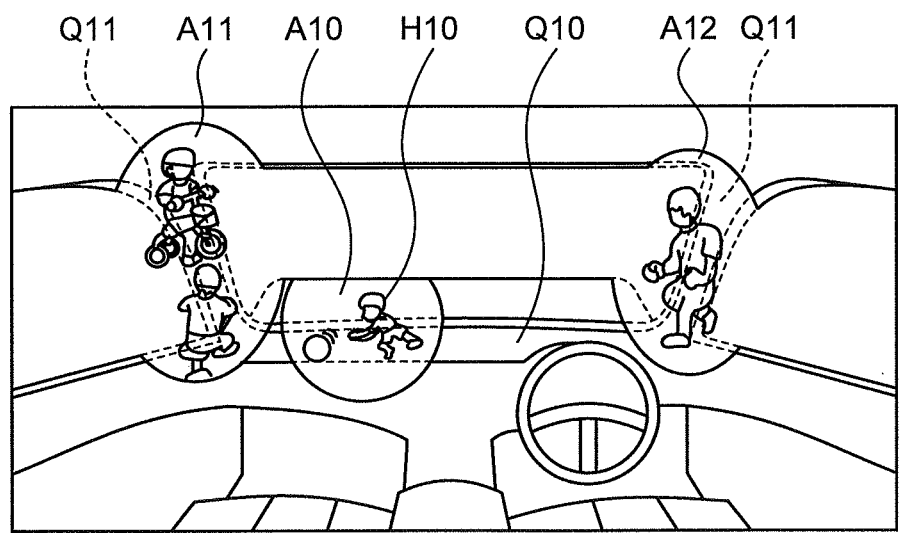
FIG. 16 schematically illustrates another example of blind region state information according to the fourth embodiment.

In Step S415, the ECU 66 causes the wearable device 1 to output the blind region state information for a predetermined period. Specifically, as illustrated in FIG. 16, in a case in which the wearable device 1 is outputting blind region state information A10, A11, and A12, and even in a case in which the line of sight of the user U1 moves, the ECU 66 keeps outputting the image data so that the blind region state information A10, A11, and A12 may be projected and displayed on the wearable device 1 for a predetermined period such as for five seconds. Accordingly, even in a case in which the user U1 moves the line of sight, the user U1 can reliably prevent moving objects and objects from being overlooked. After Step S415, the assistance device 6 moves to Step S410.

According to the fourth embodiment described above, since, the ECU 66 outputs to the wearable device 1 the blind region state information A10 corresponding to the image data including the opening portion obtained by virtually hollowing the staring region of the shielding object Q10 to cause the blind region state information A10 behind the shielding object Q10 or the shielding object Q11 to be displayed in a state in which the staring region which the user U1 stares at is hollowed, the user U1 can intuitively grasp the state of the blind region without feeling strange.

Also, according to the fourth embodiment, in a case in which the vehicle speed of the vehicle 600 is equal to or less than the predetermined speed, the ECU 66 outputs the blind region state information A10 to the wearable device 1. This can prevent the processing from being performed unnecessarily and prevent the user from feeling strange.

Figure 17:
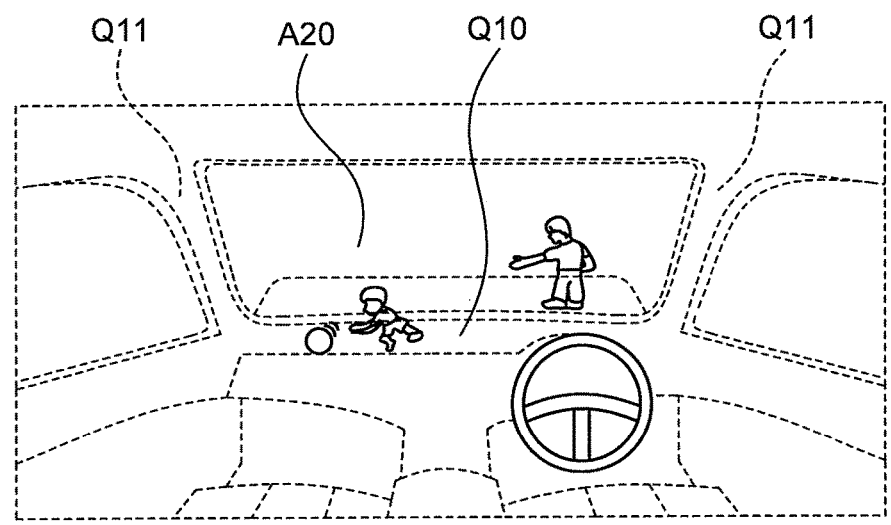
FIG. 17 schematically illustrates another example of blind region state information according to the fourth embodiment.

Meanwhile, although the ECU 66 outputs to the wearable device 1 the image data including the opening portion obtained by virtually hollowing the shielding object as the blind region state information in the fourth embodiment, the shielding object may be in a see-through state, for example. Specifically, as illustrated in FIG. 17, the ECU 66 acquires respective image data pieces from the image capturing unit 11 of the wearable device 1 and the image capturing unit 63 and, with use of the two image data pieces, outputs to the wearable device 1 image data obtained by virtually seeing through the shielding objects in the vehicle 600 such as an instrument panel and a front pillar. Subsequently, the wearable device 1 causes the projection unit 14 to project and display an image corresponding to the image data, received from the assistance device 6, obtained by virtually seeing through the shielding objects in the vehicle 600 such as an instrument panel and a front pillar. Consequently, since the shielding objects in the vehicle 600 are in a see-through state, the user U1 can intuitively grasp a position of an object.

Figure 18:
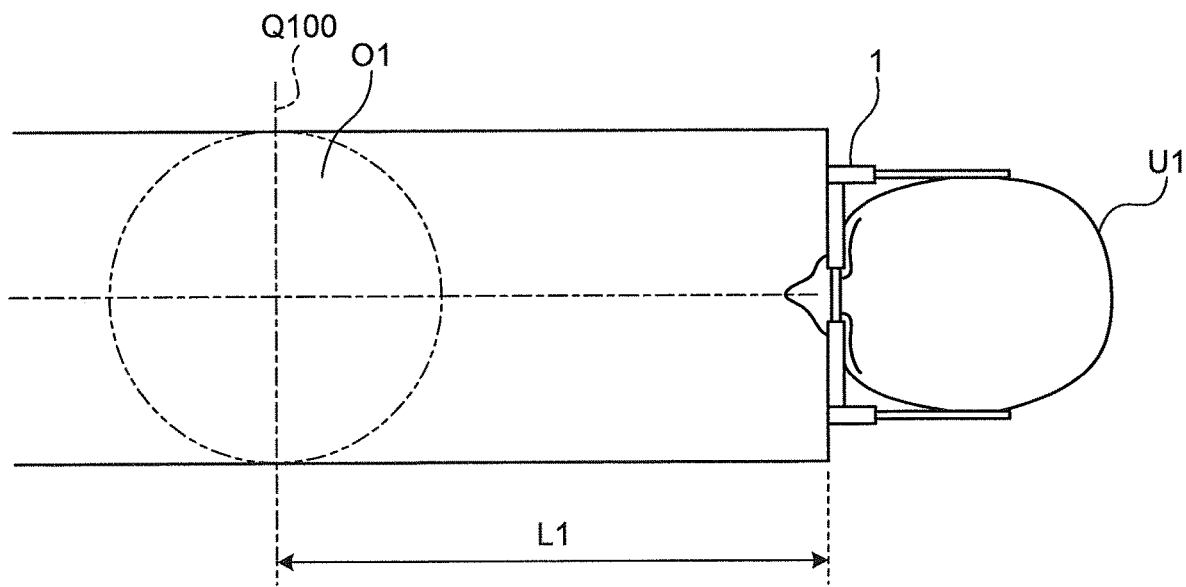
FIG. 18 illustrates an example of a shape in an image corresponding to blind region state information according to the fourth embodiment.
Figure 19:
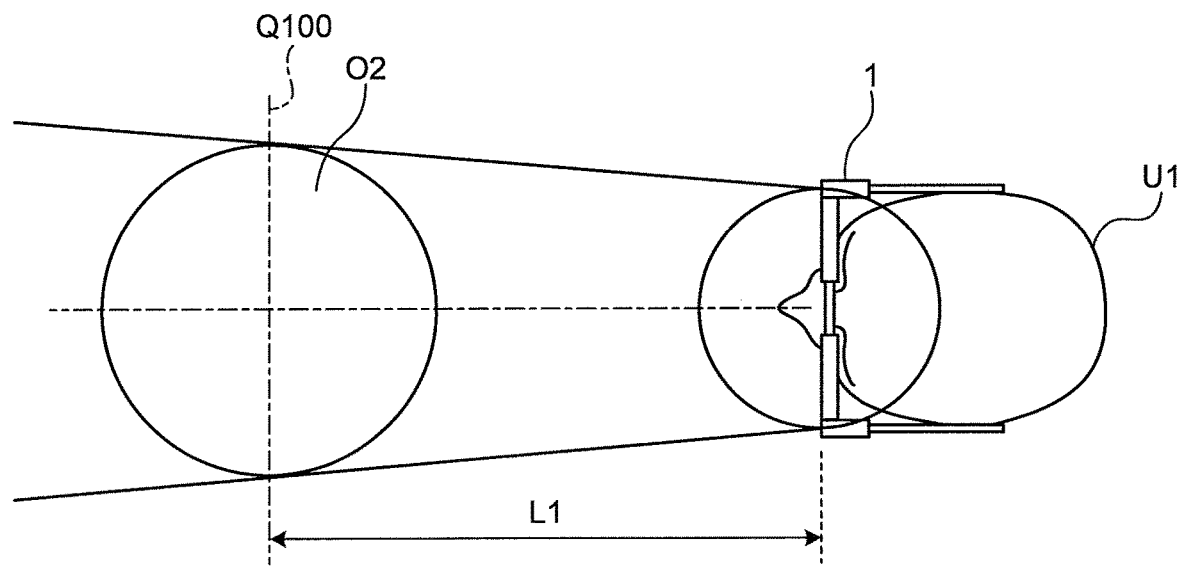
FIG. 19 illustrates an example of another shape in an image corresponding to blind region state information according to the fourth embodiment.
Figure 20:
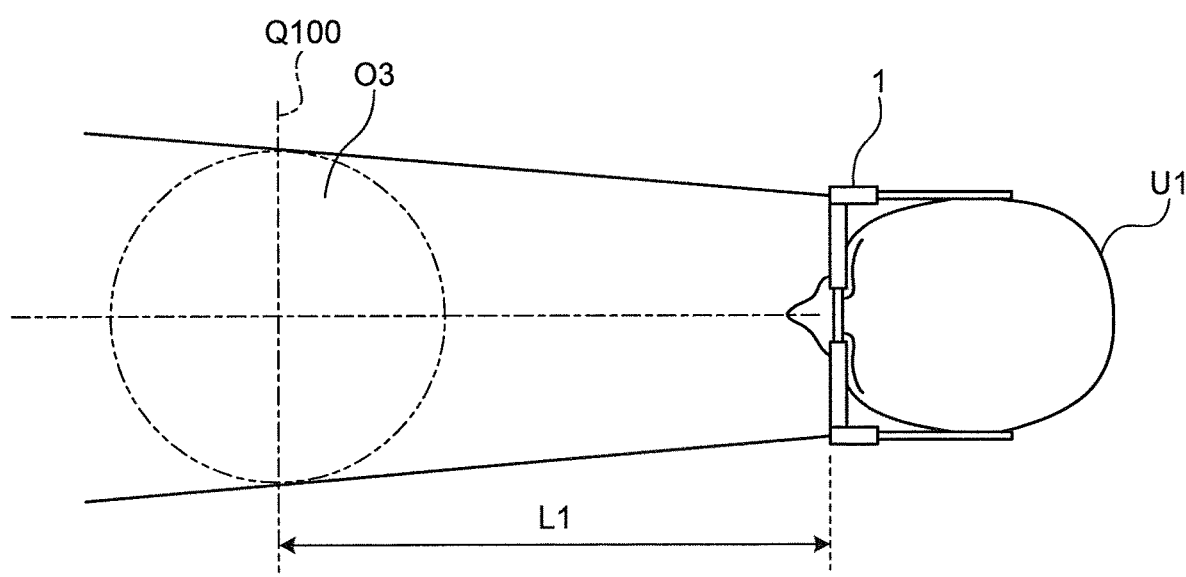
FIG. 20 illustrates an example of another shape in an image corresponding to blind region state information according to the fourth embodiment.

Also, although the ECU 66 outputs to the wearable device 1 the image data including the opening portion obtained by virtually hollowing the shielding object in the fourth embodiment, the hollowing shape can arbitrarily be changed. For example, as illustrated in FIG. 18, the ECU 66 may generate image data including an opening portion O1 obtained by virtually hollowing a shielding object Q100 located a predetermined distance L1 away from the wearable device 1 in a columnar shape and output the image data to the wearable device 1. Also, as illustrated in FIG. 19, the ECU 66 may generate image data obtained by virtually hollowing the shielding object Q100 located the predetermined distance L1 away from the wearable device 1 in a conical shape O2 and output the image data to the wearable device 1. Further, as illustrated in FIG. 20, the ECU 66 may generate image data obtained by virtually hollowing the shielding object Q100 located the predetermined distance L1 away from the wearable device 1 in a spherical shape O3 and output the image data to the wearable device 1.

Figure 21:
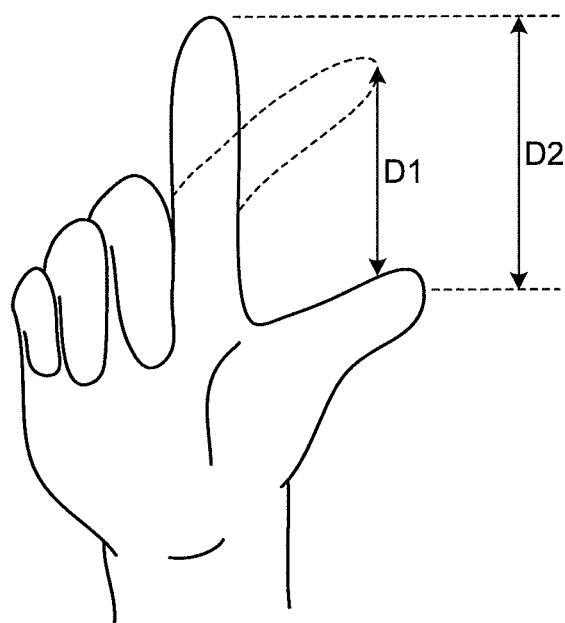
FIG. 21 is a schematic view illustrating a schematic configuration of an assistance system according to a fifth embodiment.

Also, although the ECU 66 projects and displays an image having a predetermined size on the wearable device 1 in the fourth embodiment, the size of the image to be projected and displayed on the wearable device 1 may be changed in accordance with a pinch operation, in which the distance between the thumb and the index finger is shifted from a distance D1 to a distance D2, as illustrated in FIG. 21, for example.

Fifth Embodiment

Next, a fifth embodiment will be described. In the aforementioned fourth embodiment, the ECU 66 serving as an assistance device transmits blind region state information to the wearable device 1. However, in the fifth embodiment, a server transmits blind region state information to the wearable device. Note that identical components to those in the assistance system 1001 according to the fourth embodiment described above are labeled with the same reference signs, and detailed description of the duplicate components is omitted.

Figure 22:
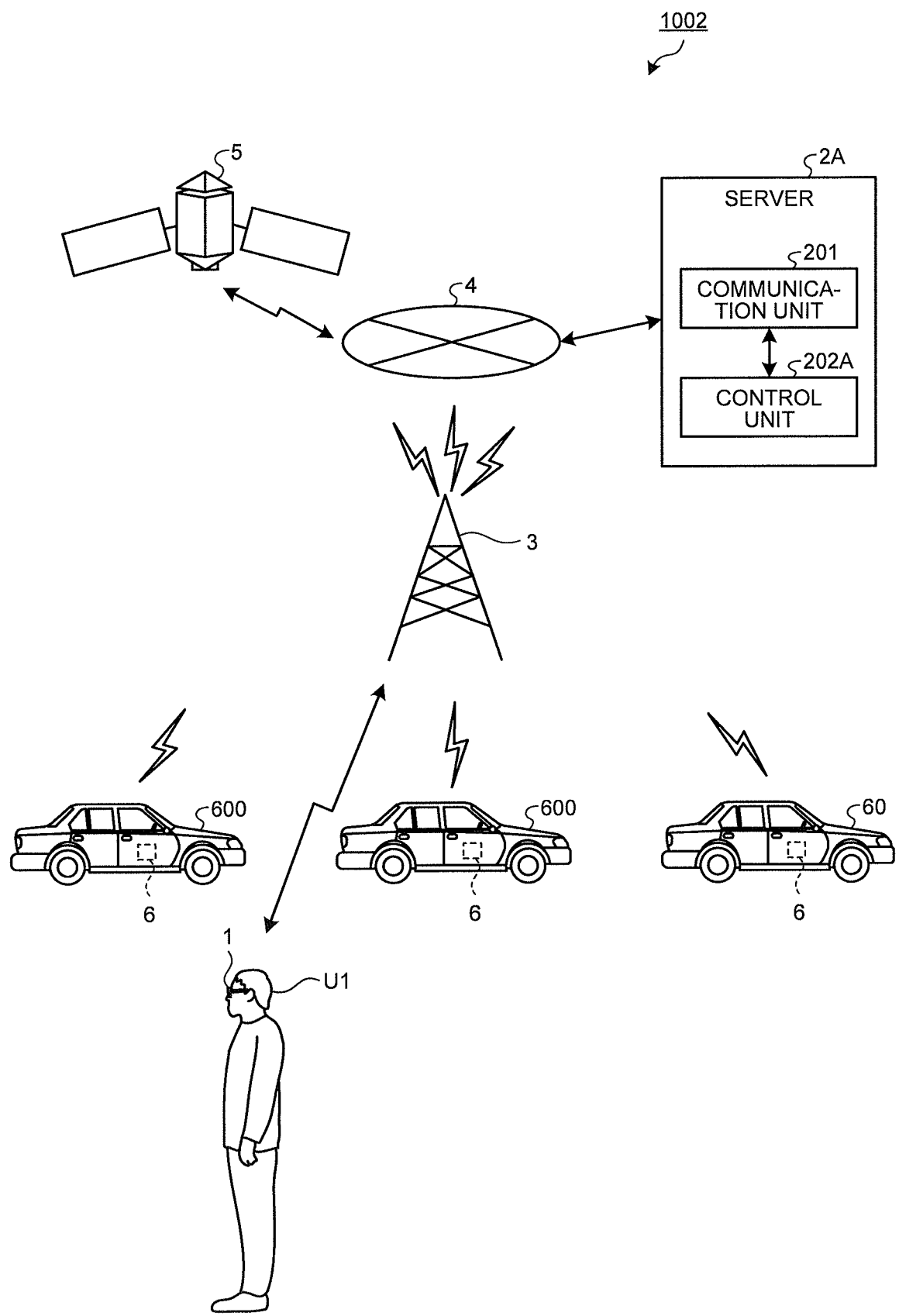
FIG. 22 illustrates a schematic configuration of a wearable device according to another embodiment.

FIG. 22 is a schematic view illustrating a schematic configuration of an assistance system according to a fifth embodiment. An assistance system 1002 illustrated in FIG. 22 includes the wearable device 1 which the user U1 wears, a server 2A, and assistance devices 6 respectively mounted on a plurality of vehicles 600. The wearable device 1, the server 2A, and the plurality of assistance devices 6 are configured to enable mutual information communication via the base station 3 and the network 4.

Configuration of Server

Next, a configuration of the server 2A will be described. The server 2A includes the communication unit 201 and a control unit 202A.

The control unit 202A includes a memory and a processor including some sort of hardware such as a CPU, a GPU, an FPGA, a DSP, and an ASIC. The control unit 202A acquires line-of-sight information about a line of sight of the user wearing the wearable device 1 via the communication unit 201 and, based on the line-of-sight information, generates and outputs to the wearable device 1 blind region state information indicating a state of a blind region shielded by a shielding object in a visual field region of the user. The control unit 202A functions similarly to the control unit 18 according to the aforementioned first to third embodiments or the ECU 66 according to the aforementioned fourth embodiment. Meanwhile, in the fifth embodiment, the control unit 202A functions as a processor.

According to the fifth embodiment described above, since the control unit 202A outputs blind region state information to the wearable device 1 so that the blind region state information may be displayed at a staring region of the shielding object, the user U1 can intuitively grasp the blind region state information and can thus grasp existence of an object in the blind region behind the shielding object.

Other Embodiments

Figure 23:
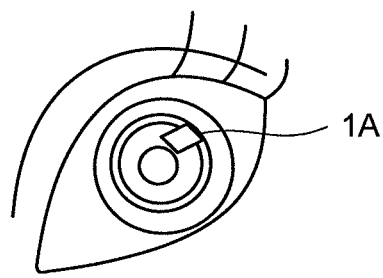
FIG. 23 illustrates a schematic configuration of a wearable device according to another embodiment.
Figure 24:
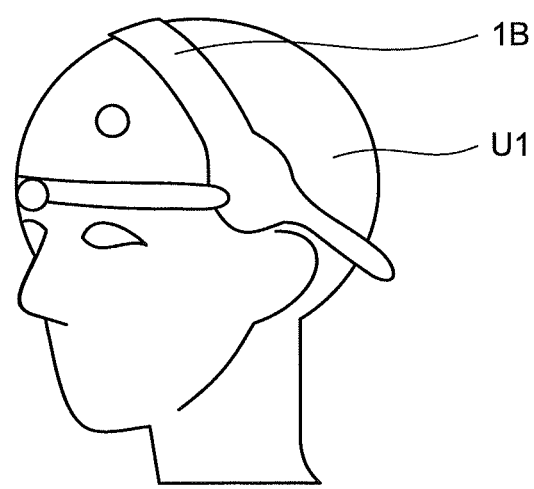
FIG. 24 illustrates a schematic configuration of a wearable device according to another embodiment.
Figure 25:
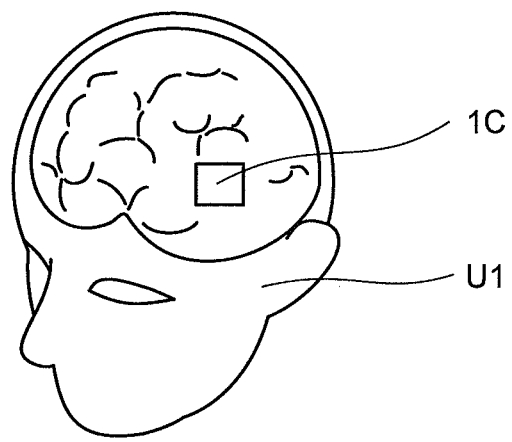
FIG. 25 illustrates a schematic configuration of a wearable device according to another embodiment.
Figure 26:
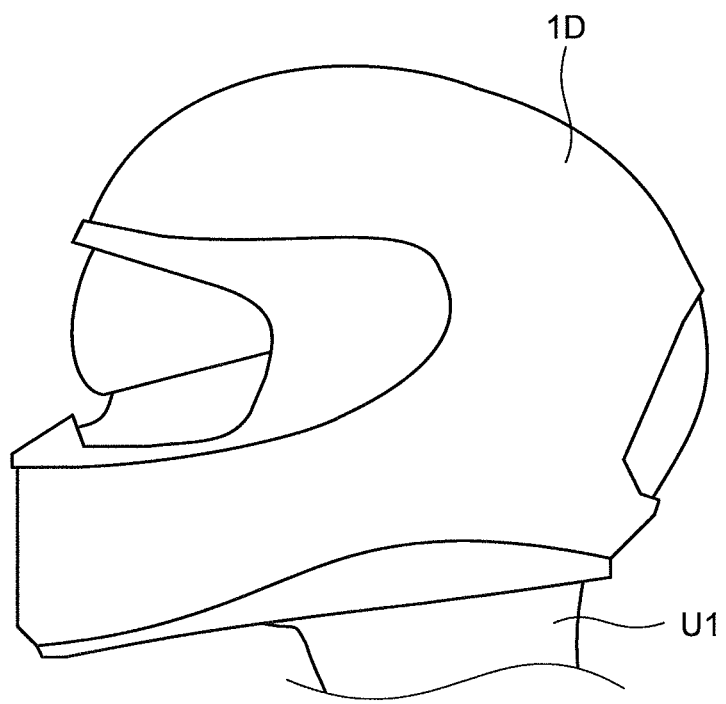
FIG. 26 illustrates a schematic configuration of a wearable device according to another embodiment.

Although examples of using the glasses-type wearable device 1 which the driver can wear have been described in the first to fifth embodiments, the disclosure is not limited to this and can be applied to various wearable devices. For example, as illustrated in FIG. 23, the disclosure can be applied to a contact-lenses-type wearable device 1A having an image capturing function. Also, the disclosure can be applied to a wearable device 1B in FIG. 24 or a brain-chip-type wearable device 1C in FIG. 25, which is a device transmitting information directly to the brain of the user U1. Further, as a wearable device 1D in FIG. 26, a helmet-like device including a visor may be used. In this case, in the wearable device 1D, an image may be projected and displayed on the visor.

Also, in the first to fifth embodiments, although the wearable device 1 projects an image to the retina of the driver to let the driver visually recognize the image, the image may be projected and displayed on a lens of glasses or the like.

Also, in the first to fifth embodiments, the aforementioned "units" can be replaced with "circuits". For example, the control unit can be replaced with the control circuit.

Also, a program to be executed by the assistance device according to each of the first to fifth embodiments is provided by recording installable or executable file data on a computer-readable recording medium such as a CD-ROM, a flexible disk (FD), a CD-R, a digital versatile disk (DVD), a USB medium, and a flash memory.

Also, the program to be executed by the assistance device according to each of the first to fifth embodiments may be provided by storing the program on a computer connected to a network such as the Internet and downloading the program via the network.

Meanwhile, in the description of the flowcharts in the present specification, although the expressions "first", "then", "subsequently", and the like are used to clarify a processing order of the steps, the processing order required to carry out each of the present embodiments shall not be defined uniquely by these expressions. That is, the processing order in each of the flowcharts described in the present specification can be changed unless it is inconsistent.

Although several embodiments of the present application have been described above in detail with reference to the drawings, these embodiments are illustrative only, and the disclosure can be embodied in other ways by modifying or improving the embodiments described in the section of the disclosure of the disclosure in various ways based on knowledge of those skilled in the art.

According to the disclosure, since the processor outputs the blind region state information to the wearable device so as to display the blind region state information in a region corresponding to the line of sight of the user, the user can grasp a state of the blind region intuitively.

According to the disclosure, since the processor outputs the blind region state information when there exists the object, the user can grasp that there exists an object.

According to the disclosure, since the processor outputs the blind region state information corresponding to the moving object in the blind region, the user can grasp a state of the moving object approaching the blind region.

According to the disclosure, since the processor outputs the blind region state information in accordance with relative speed between the moving object in the blind region and the assistance device, the user can grasp a state of the moving object approaching the blind region in real time.

According to the disclosure, since the processor generates and outputs the blind region state information with use of the image data piece obtained by capturing an image of the blind region, the user can grasp a current state in the blind region.

According to the disclosure, since the blind region state information is output to the staring region at which the user stares, the user can grasp a state of the blind region that the user needs.

According to the disclosure, in a case in which the staring period of the user is the predetermined period or longer, the processor outputs the blind region state information. Thus, the user can grasp a state of the blind region only when the user desires.

According to the disclosure, since the synthetic image in which the shielding object is in a semi-transmissive state is output as the blind region state information, the user can grasp a state of the blind region without feeling strange.

According to the disclosure, since the processor outputs the image corresponding to the image data piece obtained by capturing an image of the blind region as the blind region state information, the user can grasp an actual state of the blind region.

According to the disclosure, since the processor outputs the image including the opening portion as the blind region state information, the user can grasp a state of the blind region without feeling strange.

According to the disclosure, since the processor outputs the blind region state information only at the time of low speed or a stop, this can prevent the processing from being performed unnecessarily and prevent the user from feeling strange.

According to the disclosure, since blind region state information indicating a state of a blind region shielded by a shielding object which is blind as seen in a visual field region of a user is output, this exerts an effect of enabling the user to intuitively grasp a surrounding environment.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An assistance device enabling communication with a wearable device, comprising:
   a memory; and
   a processor including hardware, the processor being configured to:
   acquire line-of-sight information about a line of sight of a user wearing the wearable device that includes a projector configured to emit light to the user;
   acquire an image data piece obtained by capturing an image of a blind region shielded by a shielding object in a visual field region of the user, the image data piece being one of a plurality of image data pieces;
   determine, based on the image data piece, whether an object exists in the blind region;

calculate, based on a determination that an object exists in the blind region, a speed at which the object is moving based on the plurality of image data pieces;
generate, based on the line-of-sight information and on a relative speed between the moving object and the assistance device, blind region state information including a degree of urgency indicating a time to an encounter between the object and the user; and
output the blind region state information to the projector of the wearable device,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

2. The assistance device according to claim 1, wherein the image data piece is one of a plurality of chronologically-adjacent image data pieces, and
the processor is further configured to:
sequentially acquire the plurality of chronologically-adjacent image data pieces, and
based on a determination that the object exists in the blind region, determine whether the object is moving based on the plurality of image data pieces.

3. The assistance device according to claim 1, wherein the processor is further configured to:
generate the blind region state information with use of the image data piece.

4. The assistance device according to claim 1, wherein the processor is further configured to:
acquire an image data piece obtained by capturing an image of the shielding object,
generate synthetic image data obtained by synthesizing the image data piece obtained by capturing the image of the shielding object with the image data piece obtained by capturing the image of the blind region at a predetermined ratio, and
output a synthetic image corresponding to the synthetic image data as the blind region state information to the wearable device.

5. The assistance device according to claim 1, wherein the processor is further configured to:
output an image corresponding to the image data piece as the blind region state information to the wearable device.

6. The assistance device according to claim 5, wherein the processor is further configured to:
generate an image including an opening portion obtained by virtually hollowing the shielding object in a columnar, conical, or spherical shape based on an image data piece obtained by capturing an image of the shielding object and the image data piece obtained by capturing the image of the blind region, and
output the image as the blind region state information to the wearable device.

7. The assistance device according to claim 1, wherein the processor is further configured to:
generate the blind region state information by using an image data piece captured from a position above the wearable device.

8. The assistance device according to claim 1, wherein the blind region state information includes a color indicating the degree of urgency.

9. An assistance device configured to be worn by a user, comprising:
a memory; and
a processor including hardware,
wherein the processor is configured to:
acquire line-of-sight information about a line of sight of the user wearing a wearable device that includes a projector configured to emit light to the user,
acquire an image data piece obtained by capturing an image of a blind region shielded by a shielding object in a visual field region of the user, the image data piece being one of a plurality of image data pieces;
determine, based on the image data piece, whether an object exists in the blind region;
calculate, based on a determination that an object exists in the blind region, a speed at which the object is moving based on the plurality of image data pieces;
generate, based on the line-of-sight information and on a relative speed between the moving object and the assistance device, blind region state information including a degree of urgency indicating a time to an encounter between the object and the user, and
output the blind region state information to the projector of the wearable device,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

10. An assistance method performed by an assistance device enabling communication with a wearable device, comprising:
acquiring line-of-sight information about a line of sight of a user wearing the wearable device that includes a projector configured to emit light to the user;
acquiring an image data piece obtained by capturing an image of a blind region shielded by a shielding object in a visual field region of the user, the image data piece being one of a plurality of image data pieces;
determining, based on the image data piece, whether an object exists in the blind region;
calculating, based on a determination that an object exists in the blind region, a speed at which the object is moving based on the plurality of image data pieces;
generating, based on the line-of-sight information read out from a memory and on a relative speed between the moving object and the assistance device, blind region state information including a degree of urgency indicating a time to an encounter between the object and the user, and
outputting the blind region state information to the projector of the wearable device,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

11. A non-transitory computer-readable recording medium with an executable program stored thereon, the program causing an assistance device enabling communication with a wearable device to execute:
acquiring line-of-sight information about a line of sight of a user wearing the wearable device that includes a projector configured to emit light to the user;
acquiring an image data piece obtained by capturing an image of a blind region shielded by a shielding object in a visual field region of the user, the image data piece being one of a plurality of image data pieces;
determining, based on the image data piece, whether an object exists in the blind region;
calculating, based on a determination that an object exists in the blind region, a speed at which the object is moving based on the plurality of image data pieces;
generating, based on the line-of-sight information and on a relative speed between the moving object and the assistance device, blind region state information including a degree of urgency indicating a time to an encounter between the object and the user; and
outputting the blind region state information to the projector of the wearable device,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

12. An assistance device enabling communication with a wearable device, the assistance device comprising:
a memory; and
a processor including hardware, the processor being configured to:
acquire line-of-sight information about a line of sight of a user wearing the wearable device that includes a projector configured to emit light to the user;
acquire an image data piece obtained by capturing an image of a blind region shielded by a shielding object in a visual field region of the user, the image data piece being one of a plurality of image data pieces;
determine, based on the image data piece, whether an object exists in the blind region;
calculate, based on a determination that an object exists in the blind region, a speed at which the object is moving based on the plurality of image data pieces;
acquire object information from a server;
generate, based on the line-of-sight information, the object information, and on a relative speed between the moving object and the assistance device, blind region state information including a degree of urgency indicating a time to an encounter between the object and the user;
output the blind region state information to the projector of the wearable device; and
transmit collected data to the server for use by other assistance devices,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

13. An assistance device configured to be worn by a user, comprising:
a memory; and
a processor including hardware,
wherein the processor is configured to:
acquire line-of-sight information about a line of sight of the user wearing a wearable device that includes a projector configured to emit light to the user;
acquire an image data piece obtained by capturing an image of a blind region shielded by a shielding object in a visual field region of the user, the image data piece being one of a plurality of image data pieces;
determine, based on the image data piece, whether an object exists in the blind region;
calculate, based on a determination that an object exists in the blind region, a speed at which the object is moving based on the plurality of image data pieces;
acquire object information from a server;
generate, based on the line-of-sight information, the object information, and on a relative speed between the moving object and the assistance device, blind region state information including a degree of urgency indicating a time to an encounter between the object and the user;
output the blind region state information to the projector of the wearable device; and
transmit collected data to the server for use by other assistance devices,
wherein the output blind region state information includes a first mark and a second mark, each of the first mark and the second mark being projected in a region of the wearable device corresponding to a location of the shielding object,
wherein the first mark indicates less urgency and extends a first distance out from the region corresponding to the location of the shielding object, and
wherein the second mark indicates more urgency and extends a second distance out from the region corresponding to the location of the shielding object, the second distance being less than the first distance.

14. An assistance method performed by an assistance device enabling communication with a wearable device, comprising:
acquiring line-of-sight information about a line of sight of a user wearing the wearable device that includes a projector configured to emit light to the user;

acquiring an image data piece obtained by capturing an image of a blind region shielded by a shielding object in a visual field region of the user, the image data piece being one of a plurality of image data pieces;

determining, based on the image data piece, whether an object exists in the blind region;

calculating, based on a determination that an object exists in the blind region, a speed at which the object is moving based on the plurality of image data pieces;

acquiring object information from a server;

generating, based on the line-of-sight information, the object information read out from a memory, and on a relative speed between the moving object and the assistance device, blind region state information including a degree of urgency indicating a time to an encounter between the object and the user, outputting the blind region state information to the projector of the wearable device and transmitting collected data to the server for use by other assistance devices, wherein the output blind region state information includes a first mark and a second mark, each of the first mark and the second mark being projected in a region of the wearable device corresponding to a location of the shielding object, wherein the first mark indicates less urgency and extends a first distance out from the region corresponding to the location of the shielding object, and wherein the second mark indicates more urgency and extends a second distance out from the region corresponding to the location of the shielding object, the second distance being less than the first distance.

15. A non-transitory computer-readable recording medium with an executable program stored thereon, the program causing an assistance device enabling communication with a wearable device to:

acquire line-of-sight information about a line of sight of a user wearing the wearable device that includes a projector configured to emit light to the user;

acquire an image data piece obtained by capturing an image of a blind region shielded by a shielding object in a visual field region of the user, the image data piece being one of a plurality of image data pieces;

determine, based on the image data piece, whether an object exists in the blind region;

calculate, based on a determination that an object exists in the blind region, a speed at which the object is moving based on the plurality of image data pieces;

acquire object information from a server;

generate, based on the line-of-sight information, the object information, and on a relative speed between the moving object and the assistance device, blind region state information including a degree of urgency indicating a time to an encounter between the object and the user;

output the blind region state information to the projector of the wearable device and transmit collected data to the server for use by other assistance devices, wherein the output blind region state information includes a first mark and a second mark, each of the first mark and the second mark being projected in a region of the wearable device corresponding to a location of the shielding object, wherein the first mark indicates less urgency and extends a first distance out from the region corresponding to the location of the shielding object, and wherein the second mark indicates more urgency and extends a second distance out from the region corresponding to the location of the shielding object, the second distance being less than the first distance.

* * * * *